US010195575B2

(12) United States Patent
Wada et al.

(10) Patent No.: US 10,195,575 B2
(45) Date of Patent: Feb. 5, 2019

(54) GRAPHITE GROUP, CARBON PARTICLES CONTAINING SAID GRAPHITE GROUP

(71) Applicants: KOBE STEEL, LTD., Hyogo (JP); NATIONAL INSTITUTE OF ADVANCED INDUSTRIAL SCIENCE AND TECHNOLOGY, Tokyo (JP)

(72) Inventors: Ryutaro Wada, Tokyo (JP); Masaya Ueda, Hyogo (JP); Shu Usuba, Ibaraki (JP); Yozo Kakudate, Ibaraki (JP); Shuzo Fujiwara, Ibaraki (JP)

(73) Assignees: Kobe Steel, Ltd., Hyogo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/740,280

(22) PCT Filed: Jun. 28, 2016

(86) PCT No.: PCT/JP2016/069177
§ 371 (c)(1),
(2) Date: Dec. 27, 2017

(87) PCT Pub. No.: WO2017/002823
PCT Pub. Date: Jan. 5, 2017

(65) Prior Publication Data
US 2018/0200686 A1    Jul. 19, 2018

(30) Foreign Application Priority Data

Jul. 1, 2015    (JP) ................................. 2015-133154

(51) Int. Cl.
    *B01J 3/08*       (2006.01)
    *C01B 32/205*    (2017.01)

(52) U.S. Cl.
    CPC ............... *B01J 3/08* (2013.01); *C01B 32/205* (2017.08); *C01P 2004/64* (2013.01)

(58) Field of Classification Search
    CPC ... C23C 14/0611; C23C 16/27; C23C 16/279; C30B 29/04; C01B 32/25; C01B 32/205;
    (Continued)

(56) References Cited

U.S. PATENT DOCUMENTS 5,482,695 A *   1/1996   Guschin ................... B01J 3/08
                                                                        117/929
9,540,245 B1 *   1/2017   El-Eskandarany ..... C01B 32/25
                             (Continued)

FOREIGN PATENT DOCUMENTS

JP         4245310 B2     3/2009
JP         5155975 B2     3/2013
            (Continued)

OTHER PUBLICATIONS

International Search Report issued in PCT/JP2016/069177; dated Sep. 6, 2016.
(Continued)

*Primary Examiner* — Daniel McCracken
(74) *Attorney, Agent, or Firm* — Studebaker & Brackett PC

(57) ABSTRACT

Provided is graphite group that, when observed with a transmission electron microscope, has a laminated surface spacing of 0.2-1 nm, includes graphite pieces measuring 1.5-10 nm in a direction perpendicular to the laminating direction, the laminating direction of the graphite pieces being irregular.

5 Claims, 7 Drawing Sheets

(58) Field of Classification Search
CPC ........... C04B 41/5002; C04B 2235/427; C02F 2001/46147; B01J 3/08; C01P 2004/64
USPC .................................................. 423/446, 448
See application file for complete search history.

(56) References Cited

U.S. PATENT DOCUMENTS

| | | |
|---|---|---|
| 2003/0228249 A1 | 12/2003 | Fujimura et al. |
| 2006/0147644 A1 | 7/2006 | Fujimura et al. |
| 2010/0069513 A1 | 3/2010 | Fujimura et al. |
| 2011/0209642 A1 | 9/2011 | Fujimura et al. |
| 2012/0022231 A1* | 1/2012 | Curmi .................... B82Y 30/00 530/345 |
| 2012/0315212 A1* | 12/2012 | Williams ............... B82Y 30/00 423/446 |
| 2015/0135603 A1* | 5/2015 | Can .......................... B01J 3/062 51/309 |
| 2016/0318809 A1 | 11/2016 | Wada et al. |
| 2017/0183234 A1 | 6/2017 | Wada et al. |

FOREIGN PATENT DOCUMENTS

| | | |
|---|---|---|
| JP | 2015-127279 A | 7/2015 |
| JP | 2015-227260 A | 12/2015 |

OTHER PUBLICATIONS

Written Opinion issued in PCT/JP2016/069177; dated Sep. 6, 2016.
Kakudate; "2-3. Dynamic High Pressure (Detonation Method)"; Industrial Diamond Association of Japan; "Handbook of Diamond Technology"; NGT; Jan. 2007; pp. 28 to 33.

* cited by examiner

GRAPHITE GROUP, CARBON PARTICLES CONTAINING SAID GRAPHITE GROUP

TECHNICAL FIELD

The present invention relates to a graphite group including graphite pieces and a carbon particle including the graphite pieces.

BACKGROUND ART

Nano-scale diamond (also referred to as "nanodiamond") has a large number of excellent properties such as a high hardness and an extremely low coefficient of friction, and therefore, it has been already utilized in various fields and its development of application has been investigated as an extremely promising new material.

It has been known that nanodiamond can be synthesized by, for example, utilizing a detonation reaction of a high explosive. This synthesis method is generally called a detonation method, in which detonation is performed with only a raw material substance containing an aromatic compound having three or more nitro groups (hereinafter referred to as "low explosive raw material") as a carbon source, and carbon atoms decomposed and liberated from a molecule constituting the low explosive raw material by the detonation reaction are formed as diamond at high temperature and high pressure during the detonation (for example, see Non-Patent Literature 1).

The production of nanodiamond by the detonation method has hitherto been performed in, for example, the East European countries such as Russia and the Ukraine, the United States of America, China, and the like. In these countries, since a military waste low explosive is inexpensively available as the low explosive raw material that is the carbon source, trinitrotoluene (TNT), an explosive mixture of TNT and hexogen (RDX: trimethylenetrinitramine) or octogen (HMX: cyclotetramethylenetetranitramine), or the like has been used.

In the present invention, a high explosive means a substance capable of performing a detonation reaction, and examples thereof may include not only a low explosive raw material but also a raw material substance containing an aromatic compound having two or less nitro groups (hereinafter referred to as "non-explosive raw material"). In addition, an explosive substance means a substance causing a sudden combustion reaction, and may be a solid one or a liquid one at normal temperature and normal pressure.

It is anticipated that the demanded amount of nanodiamond will increase more and more in the future with the development of its application.

CITATION LIST

Patent Literature

Patent Literature 1: Japanese Patent No. 4245310
Patent Literature 2: Japanese Patent No. 5155975

Non-Patent Literature

Non-Patent Literature 1: Yozo Kakudate (author), "2-3. Dynamic High Pressure (Detonation Method)", Industrial Diamond Association of Japan (editor), "Handbook of Diamond Technology", NGT, January 2007, pp. 28 to 33

SUMMARY OF THE INVENTION

Technical Problems

Carbon particles produced by a detonation method contain not only nanodiamond but also carbon impurities mainly including nano-scale graphite carbon (hereinafter referred to as "nanographite") which is a carbon component having no diamond structure. That is, the raw material substance causes detonation, whereby the raw material substance is decomposed to an atomic level, and carbon atoms liberated therefrom without being oxidized aggregate in a solid state to form carbon particles. During the detonation, the raw material substance is in a high-temperature high-pressure state due to a decomposition reaction. However, the raw material substance is immediately expanded and cooled. This process from the high-temperature high-pressure state to the reduced-pressure and cooling state is caused within a very short time as compared with deflagration that is an explosion phenomenon slower than normal combustion or detonation, and therefore, there is no time when the aggregated carbon grows largely. Thus, nano-scale diamond is formed. When a high explosive (such as an explosive mixture of TNT and RDX) known as a typical high explosive causing detonation is used as the raw material substance, pressure during the detonation becomes high enough to allow produced carbon particles to contain plenty of nanodiamond as expected easily from a thermodynamic equilibrium phase diagram of carbon. On the other hand, carbon atoms that do not form a diamond structure become nano-scale graphite carbon (nanographite) or the like.

Of carbon particles, nanographite etc. other than nanodiamond have been regarded as undesired in order to use the excellent properties of nanodiamond. Therefore, the background art has focused on how to eliminate carbon impurities such as nanographite as much as possible to thereby purify nanodiamond by various purification methods or chemical treatments (for example, see Patent Literature 1 or 2). However, nanographite is, for example, lower in hardness than nanodiamond, and higher in electric conductivity than nanodiamond. In addition to such different physical properties from nanodiamond, nanographite has the feature that various kinds of atoms or functional groups other than carbon can be coupled with nanographite so that new functions can be provided. Accordingly, nanographite has attracted attention as a promising new material capable of providing various properties when it is used alone or as a mixture with nanodiamond.

An object of the present invention is to provide a graphite group available as a new material, in which graphite pieces having a specific form are aggregated. Another object of the present invention is to provide a carbon particle which is a mixture of the aforementioned graphite group and diamond.

Solution to Problems

The graphite group in the present invention which is capable of solving the foregoing problem(s) is a graphite group including graphite pieces, the graphite pieces having a lamination with a plane interval of 0.2 to 1 nm and a dimension of 1.5 to 10 nm in a direction perpendicular to a lamination direction when observed by a transmission electron microscope, in which the lamination direction in each of the graphite pieces is irregular.

The present invention also encompass a carbon particle which is a mixture of the aforementioned graphite group and diamond, in which the carbon particles is obtained by a detonation method, and a ratio G/D of a mass G of the graphite group to a mass D of the diamond in the carbon particle is 0.7 to 20.

It is preferable that the detonation method includes (1) a step of disposing an explosive substance A with a detonation velocity of 6,300 m/sec or higher in a periphery of a raw material substance A containing an aromatic compound having two or less nitro groups, and a step of detonating the explosive substance A. or (2) a step of disposing an explosive substance B which is liquid at normal temperature and normal pressure in a periphery of a raw material substance B containing an aromatic compound having three or more nitro groups, and a step of detonating the explosive substance B.

It is preferable that the raw material substance A contains at least one kind selected from the group consisting of dinitrotoluene, dinitrobenzene and dinitroxylene.

It is preferable that the raw material substance B contains at least one kind selected from the group consisting of trinitrotoluene, cyclotrimethylenetrinitramine, cyclotetramethylenetetranitramine, pentaerythritol tetranitrate and trinitrophenylmethylnitramine.

Advantageous Effects of Invention

In the graphite group in the present invention, graphite pieces having a specific form are aggregated, and the graphite group can be used as a new material. In addition, the carbon particle which is a mixture of the graphite group and diamond is also used as a new material.

DESCRIPTION OF EMBODIMENTS

Figure 1:
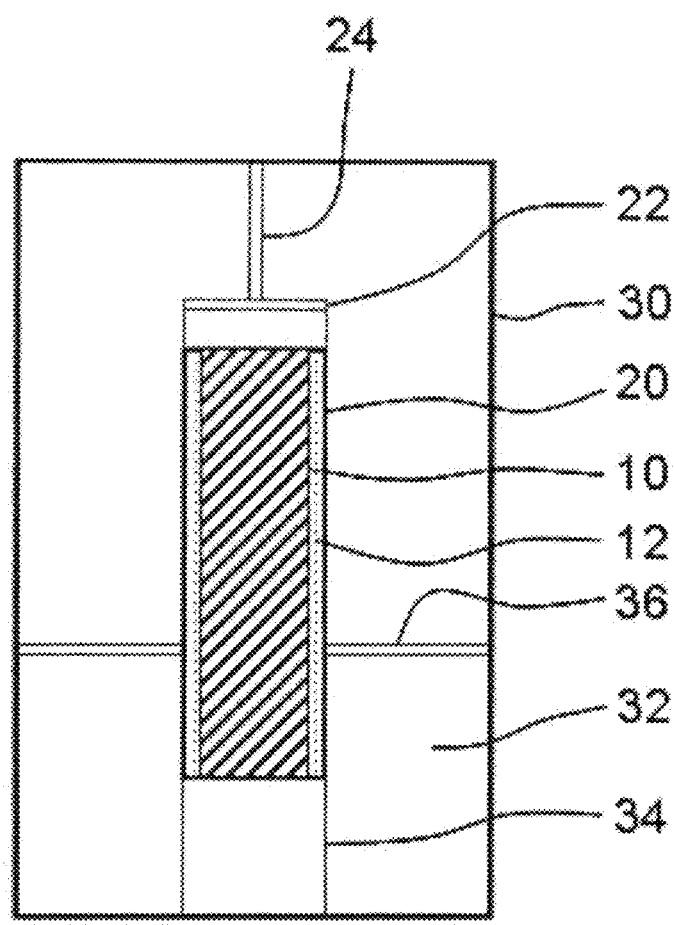
FIG. 1 is a sectional diagram schematically showing an example of an explosive device used in a production method according to the present invention.

The present inventors performed earnest examinations in order to provide a graphite group capable of being used as a new material. As a result, the present inventors found that a graphite group constituted by aggregated fine graphite pieces could be used as a new material, and completed the present invention. That is, the graphite group in the present invention is a graphite group including graphite pieces having a lamination with a plane interval of 0.2 to 1 nm and a dimension of 1.5 to 10 nm in a direction perpendicular to a lamination direction, when observed by a transmission electron microscope, and the lamination direction in each of the graphite pieces is irregular. In the graphite group in the present invention, reactivity is improved as compared with coarse graphite pieces, due to the aggregated fine graphite pieces in which the plane interval of lamination is 0.2 to 1 nm and the dimension in the direction perpendicular to the lamination direction is 1.5 to 10 nm. Accordingly, when the graphite group is, for example, fluorinated, fluorine can be easily introduced therein, and thus, very high water repellency is exhibited.

The irregular lamination direction in each of the graphite pieces means that lamination directions in adjacent ones of the graphite pieces are not the same directions.

The present invention also encompasses a carbon particle which is a mixture of the aforementioned graphite group and diamond, in which the carbon particle is obtained by a detonation method, and a ratio G/D of a mass G of the graphite group to a mass D of the diamond in the carbon particles is 0.7 to 20. Since the graphite group and the diamond are contained, it is possible to acquire both good reactivity caused by the graphite group and properties such as high hardness caused by the diamond. The composition and physical properties of the carbon particles in the present invention will be described below in detail.

The carbon particles in the present invention can be defined by the content proportion of a carbon component expressed by mass ratio. As described above, the raw material substance causes detonation, whereby the raw material substance is decomposed to an atomic level, and carbon atoms liberated therefrom without being oxidized aggregate in a solid state to form carbon particles. During the detonation, the raw material substance is in a high-temperature high-pressure state due to a decomposition reaction. However, the raw material substance is immediately expanded and cooled. This process from the high-temperature high-pressure state to the reduced-pressure and cooling state is caused within a very short time as compared with normal combustion or deflagration that is an explosion phenomenon slower than the detonation, and therefore, there is no time when the aggregated carbon grows largely. Thus, the nano-scale carbon particles are formed.

When a high explosive such as the aforementioned RDX or HMX known as a typical high explosive causing detonation is used as the raw material substance, pressure during the detonation becomes high enough to allow produced carbon particles to contain plenty of nanodiamond as expected easily from a thermodynamic equilibrium phase diagram of carbon. On the other hand, when a non-high explosive is used as the raw material substance, the pressure during the detonation is not high enough to synthesize diamond. Thus, nano-scale carbon particles other than diamond are produced. The carbon particles contain plenty of the graphite group. In this manner, the content proportion between nanodiamond and the graphite group can be controlled by pressure during detonation of a raw material substance. That is, by use of a raw material substance that is not a high explosive, the content proportion of the graphite group can be increased. However, when the pressure during detonation of the raw material substance is lower than that of a high explosive, it is difficult to detonate the raw material substance, or even if the raw material substance can be detonated, it is likely to cause a phenomenon that the detonation may be interrupted. This suggests that it is difficult to stably detonate the raw material substance alone. Therefore, when the pressure during detonation of the raw material substance is low, an explosive substance causing detonation has to be disposed in the periphery of the raw material substance to thereby contrive to surely detonate the raw material substance. In addition, in any case, it is important to select a raw material substance having a composition that does not oxidize the liberated carbon.

Further, it is preferable that an oxidative substance such as oxygen or ozone that can oxidize the liberated carbon to form gas such as CO or $CO_2$ is removed from a detonation system as much as possible.

In addition, when a raw material substance containing low explosive raw materials or an aromatic compound having two or less nitro groups is detonated, it is assumed that any kinds of nano-scale carbon particles such as diamond, graphite, fine carbon nanotube, fulleren, etc. are produced.

From literatures (Satoshi Tomita et al., "Diamond nanoparticles to carbon onions transformation: X-ray diffraction studies", Carbon 40, pp. 1469-1474 (2002), Dilip K. Singh et al, "Diameter dependence of interwall separation and strain in multiwalled carbon nanotubes probed by X-ray diffraction and Raman scattering studies", Diamond & Related Materials 19, pp. 1281-1288 (2010), etc.) and the results of X-ray diffraction data of detonation nanodiamond acquired so far as described below, it may be assumed that a peak in which a diffraction angle $2\theta$ of the X-ray diffraction data measured by a $Cu(K\alpha)$ tube is near 24 to 26° (hereinafter referred to as "peak near 26°") is originated from a nanocarbon substance composed mainly of a laminate sp2 carbon structure. In addition, with respect to (multilayer) carbon nanotubes of two layers, three layers or the like, a peak appears in this region.

Figure 4:
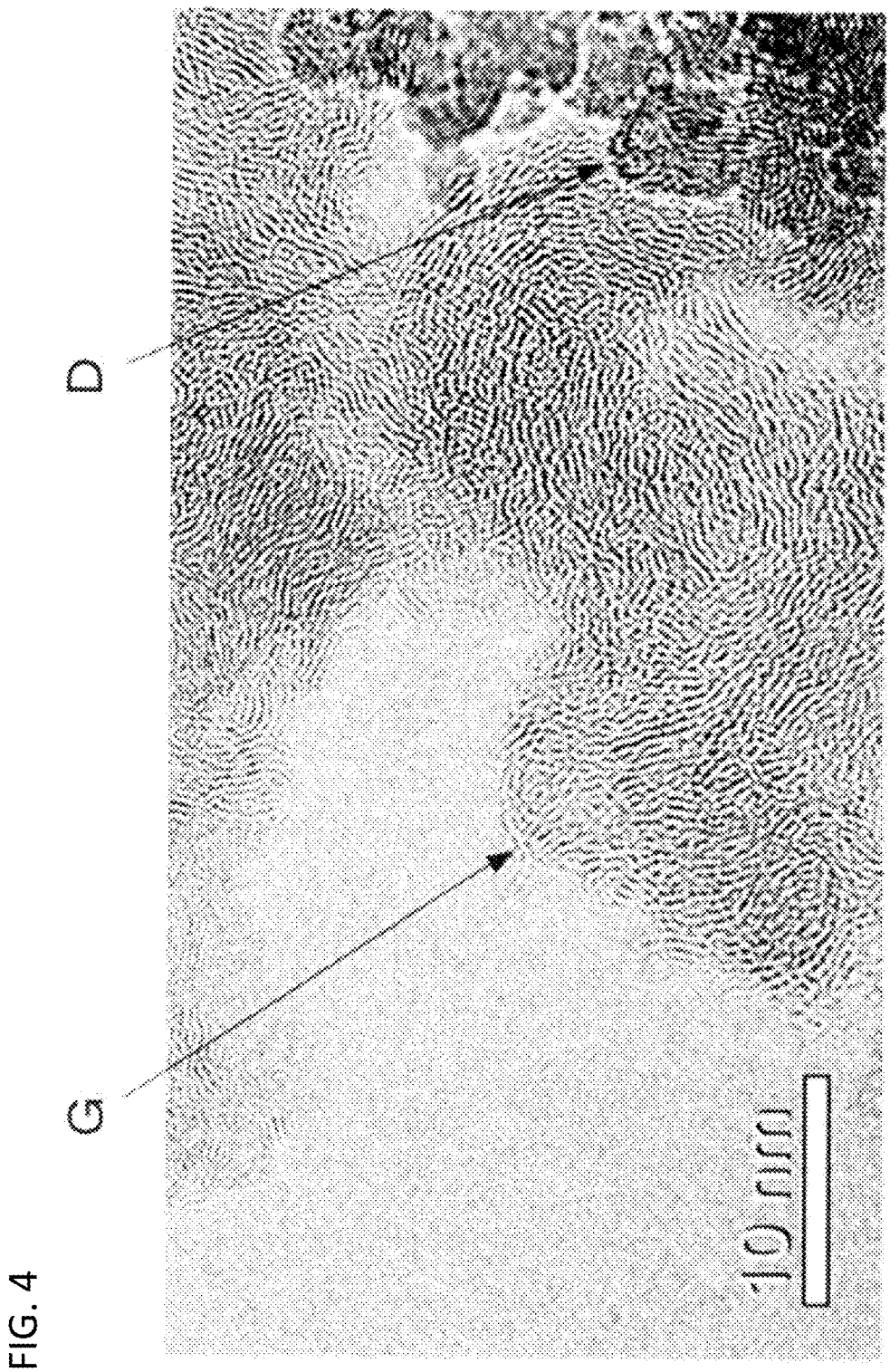
FIG. 4 shows a drawing substitute photograph in which a part of the drawing substitute photograph c shown in FIG. 3 is enlarged.

The results of observation of a lattice image in a transmission electron microscopic (TEM) photograph of carbon particles obtained in Experimental Example 3 (3#6) as described later are shown in FIG. 4. In FIG. 4, two kinds of shapes of lattice images were observed. That is, a round spherical shape and a laminated shape (graphite pieces) were observed as shown by the symbols D and G respectively. Both of them are of a nano-scale, and in view of the existent amounts thereof, the both are assumed as particles having carbon as a main component. Since the particles of carbon observed herein are assumed to be nanodiamond and graphite group in which the graphite pieces are aggregated, their lattice spacing and plane interval of lamination were measured and compared. As for a scale bar (5 nm and 10 nm) and a magnification of TEM, a sample in which an SiGe multilayered film is attached to an Si single crystal is used as a standard sample, and at a high magnification, calibration is made on the basis of an Si 111 plane interval of 3.1355 Å. This calibration operation has been confirmed to be within 5% by an accuracy management of every month.

In the diamond (symbol D) taken in the same field of FIG. 4, a D 111 plane was observed, and the result of the measured lattice spacing was 2.11 Å. It is generally said that the D 111 plane lattice spacing in cubic diamond is 2.06 Å by powder diffractometry, and the difference ratio therefrom is 2.4%. On the other hand, the result of the plane interval of lamination observed in the part shown by the symbol G in FIG. 4 was 3.46 Å. It is said that the G 002 plane interval in the lamination of hexagonal graphite is 3.37 Å by powder diffractometry, and the difference ratio therefrom is 2.4%. Thus, the observed plane interval of the lamination substantially agreed with the plane interval of lamination of graphite pieces. It is therefore considered that the laminated nano-scale carbon particles are the graphite group, occupying a major proportion of the carbon particles.

In the X-ray diffraction data, nanodiamond can be confirmed. However, as for the nano-scale carbon particles, it is not clear what kind of substance is contained other than the graphite group and fine multilayer carbon nanotube providing the peak near 26°. Fine monolayer (single) carbon nanotubes or various fullerenes do not take part in the peak near 26°. Therefore, their production amount is not included in the quantitative result based on the peak near 26°. Further, it can be, for example, assumed that nano-scale carbon particles whose laminated (graphite) structure has been changed to a turbostratic structure are also included in the peak near 26°. It cannot be denied that mixture of peaks of those deformed nano-scale carbon particles may act to expand the width of the peak near 26°. However, from the TEM photograph, it has been found that the production amount of fine monolayer (single) carbon nanotubes, various fullerenes, etc. is small. That is, when carbon particles are produced by a detonation method, it is assumed that the production amount of nano-scale carbon particles that are not expressed by the peak near 26° can fall within a certain proportion range of a low mass ratio. It is therefore assumed that a large error is not provided even when all the carbon other than diamond is regarded as graphite carbon. Further, it is assumed that carbon with another structure is rare.

From the aforementioned background, it is assumed that if kinds, amounts and configurations of a raw material substance and an explosive substance are determined in a specified production method, nanodiamond and the graphite group produced by the production method can fall within a certain proportion range of a mass ratio. It is therefore assumed that a large error is not provided even when all the carbon other than diamond is regarded as the graphite group. Accordingly, it is assumed that carbon with another structure than diamond and the graphite group is rare. Thus, on the assumption that carbon other than diamond is the graphite group, the ratio between them is obtained.

From the aforementioned background, the carbon particles in the present invention contains a graphite group and diamond. More specifically, when the mass of the graphite group is G and the mass of the diamond is D, the mass ratio G/D is 0.7 or more, preferably 1 or more, more preferably 2 or more, and still more preferably 3 or more. As the upper limit of the mass ratio G/D, it is 20 or less, preferably 18 or less, and more preferably 16 or less. The mass ratio G/D is obtained by the method which will be explained in the following examples.

The carbon particles can be produced by a detonation method including steps in the following paragraph (1) or the following paragraph (2).

(1) A detonation method including a step of disposing an explosive substance A with a detonation velocity of 6,300 m/sec or higher in a periphery of a raw material substance A containing an aromatic compound having two or less nitro groups and a step of detonating the explosive substance A.

(2) A detonation method including a step of disposing an explosive substance B which is liquid at normal temperature and normal pressure in a periphery of a raw material substance B containing an aromatic compound having three or more nitro groups and a step of detonating the explosive substance B.

The detonation method in the aforementioned paragraph (1) will be referred to as a production method (1), and the detonation method in the aforementioned paragraph (2) will be referred to as a production method (2). Those production methods will be described below in detail.

<<Production Method (1)>>

In the aforementioned production method (1), first, an explosive substance A with a detonation velocity of 6,300 m/sec or higher is disposed in a periphery of a raw material substance A containing an aromatic compound having two or less nitro groups. The aromatic compound having two or less nitro groups is a non-explosive raw material contained in the raw material substance A as a carbon source for the detonation method. The explosive substance A with a detonation velocity of 6,300 m/sec or higher is a substance causing stable detonation to produce carbon particles from the raw material substance A. When a molecule forming the explosive substance A contains carbon atoms, the explosive substance A may serve as a carbon source together with the raw material substance A.

Examples of the aromatic compound having two or less nitro groups may include a compound having a structure in which 0, 1 or 2 hydrogen atom(s) of an aromatic ring such as benzene, toluene, xylene, naphthalene or anthracene are substituted with nitro group(s).

The aforementioned aromatic compound may have a substituent other than the nitro groups. Examples of such substituents may include an alkyl group, a hydroxy group, a hydroxyalkyl group, an amino group, a halogen group, and the like.

There may be a case where position isomers are present depending on the positional relation of the nitro groups or the substituents. However, all of the position isomers can be used in the aforementioned production method (1). For example, when the aromatic compound is nitrotoluene, 3 kinds of isomers, that is, 2-, 3- and 4-nitrotoluenes are conceivable.

Examples of such an aromatic compound having two or less nitro groups may include benzene, toluene, xylene, naphthalene, anthracene, nitrobenzene, nitrotoluene, nitroxylene, nitronaphthalene, nitroanthracene, dinitrobenzene, dinitrotoluene, dinitroxylene, dinitronaphthalene, dinitroanthracene, etc. Each of the aromatic compounds each having two or less nitro groups may be used alone, or two or more kinds of the aromatic compounds each having two or less nitro groups may be used together.

It is preferred that the aromatic compound having two or less nitro groups is a compound having a structure in which 1 or 2 hydrogen atom(s) of an aromatic ring are substituted with nitro group(s). Of such aromatic compounds each having two or less nitro groups, for example, dinitrotoluene (DNT), dinitrobenzene (DNB), dinitroxylene (DNX), and the like are preferred in terms of their low melting points and molding easiness.

The raw material substance A may contain a low explosive raw material in addition to the aromatic compound having two or less nitro groups as a non-explosive raw material. The low-explosive raw material is, for example, a compound having three or more nitro groups, which is generally a nitro compound to be used for explosion. Examples of such nitro compounds may include trinitrotoluene (TNT), hexogen (RDX; cyclotrimethylenetrinitramine), octogen (HMX; cyclotetramethylenetetranitramine), pentaerythritol tetranitrate (PETN), tetryl (tetranitromethylaniline), and the like. Each of the nitro compounds may be used alone, or two or more kinds of the nitro compounds may be used together.

The content proportion of the aromatic compound having two or less nitro groups in the aforementioned raw material substance A is generally 50% by mass or more, preferably 80% by mass or more, more preferably 90% by mass or more, and still more preferably 95% by mass or more, relative to the total mass of the raw material substance A. When the aromatic compound having two or less nitro groups, which is an inexpensive non-explosive raw material, is contained at a high proportion, the content proportion of a compound having three or more nitro groups, which is an expensive low-explosive raw material, can be reduced. Therefore, most preferably, the content proportion of the aromatic compound having two or less nitro groups is 100% by mass as the upper limit thereof. However, the upper limit thereof may be preferably about 99% by mass or about 98% by mass.

The detonation velocity of the explosive substance A disposed in the periphery of the aforementioned raw material substance A must be made higher than the detonation velocity of the raw material substance A. That is, of the aromatic compound having two or less nitro groups and contained in the raw material substance A, for example, dinitrotoluene (DNT, true density: 1.52 g/cm$^3$, melting point: 67 to 70° C.) that is inexpensive and easy to use is so stable that it cannot be detonated easily. However, the detonation velocity thereof can be estimated as about 6,000 m/sec if it can be detonated. It is therefore necessary to make the detonation velocity of the explosive substance A not lower than this viscosity. The detonation velocity of a typical explosive substance A is generally 10,000 m/sec or lower. In the present invention, therefore, the detonation velocity of the explosive substance A is 6,300 m/sec or higher, and as the upper limit thereof, it is preferably 10,000 msec or lower. As for the detonation velocity of DNT, it is possible to refer to Combustion and Flames, Vol. 14 (1970), pp. 145.

The detonation velocity means a propagation velocity of detonation when the detonation is caused by an explosive substance A.

Of such explosive substances A, examples of solid ones may include TNT, RDX, HMX, PETN, tetryl, an explosive mixture (for example. Composition B) having RDX and TNT as its major components, an explosive mixture (for example, Octol) having HMX and TNT as its major components, etc.

A liquid high explosive may be also used as the explosive substance A. When the liquid high explosive is used as the explosive substance A, the degree of freedom in shape is high, an increase in size is easy, and operability or safety can be improved, as compared with the case of using a solid high explosive. Examples of such liquid high explosives may include a mixture of hydrazine (including hydrazine hydrate that is a hydrate thereof) and hydrazine nitrate, a mixture of hydrazine and ammonium nitrate, a mixture of hydrazine, hydrazine nitrate and ammonium nitrate, nitromethane, a mixture of hydrazine and nitromethane, and the like.

Of the aforementioned explosive substances A, TNT easy to be molded, Composition B containing TNT as its major component, or the like, is preferred as solid one due to a low melting point. Each of the aforementioned explosive substances A may be used alone, or two or more kinds of the explosive substances A may be used together. Properties and detonation velocities of typical explosive substances A are shown in the following Table 1. The explosive substances A capable of causing stable detonation are shown in the following Table 1.

TABLE 1

| Explosive substance | Molecular formula | Density[1] (g/cm$^3$) | Detonation velocity (m/s) | Melting point (° C.) |
|---|---|---|---|---|
| TNT | C$_7$H$_5$N$_3$O$_6$ | 1.64 | 6940 | 80.9 |
| RDX | C$_3$H$_6$N$_6$O$_6$ | 1.77 | 8640 | 204.1 |

TABLE 1-continued

| Explosive substance | Molecular formula | Density[1] (g/cm$^3$) | Detonation velocity (m/s) | Melting point (° C.) |
|---|---|---|---|---|
| HMX | $C_4H_8N_8O_8$ | 1.89 | 9110 | 278.0 |
| PETN | $C_5H_8N_4O_{12}$ | 1.67 | 7980 | 142.9 |
| Tetryl | $C_7H_5N_8O_8$ | 1.68 | 7670 | 129.4 |
| Composition B[2] | — | 1.71 | 8020 | 80.1 |
| Octol (75/25)[3] | — | 1.81 | 8450 | 80.1 |
| Nitromethane | $CH_3NO_2$ | 1.13 | 6260 | — |
| NH + HH[4] | — | 1.39 | 8330 | — |

[1]Density at time of measurement of detonation velocity
[2]Explosive mixture of 59.5% by mass of RDX, 39.5% by mass of TNT and 1.0% by mass of wax
[3]Explosive mixture of 75% by mass of HMX and 25% by mass of TNT
[4]Hydrazine-based liquid high explosive in which hydrazine nitrate ($H_2N$—$NH_2$•$HNO_3$) and hydrazine hydrate ($H_2N$—$NH_2$•$H_2O$) are mixed at mass ratio of 3:1

The detonation velocity of nitromethane is based on Kusakabe and Fujiwara "Studies regarding Detonation of Liquid High Explosives (First Report)", Journal of the Industrial Explosives Society, Japan, Vol. 40, No. 2 (1979), p. 109. The detonation velocity of NH+HH (hydrazine nitrate ($H_2N$—$NH_2$—$HNO_3$) and hydrazine hydrate ($H_2N$—$NH_2.H_2O$)) is based on Kusakabe et al. "Studies regarding Detonation of Liquid High Explosives (Third Report)", Journal of the Industrial Explosives Society, Japan, Vol. 41, No. 1 (1980), p. 23. The detonation velocities of the other substances than nitromethane and NH+HH are based on LASL Explosive Properties Date, ed. Gibbs, T. R. and Propolato, A., University of California Press, Berkeley, Los Angels, London, 1980.

Use amounts of the aforementioned raw material substance A and the aforementioned explosive substance A may be adjusted individually and appropriately depending on a desired amount of carbon particles. Though not limited especially, the mass ratio represented by "explosive substance A/raw material substance A" is preferably 0.1 or more, and more preferably 0.2 or more. In addition, the mass ratio is preferably 1 or less, more preferably 0.9 or less and still more preferably 0.8 or less. When the use amount ratio is lower than 0.1, it is impossible to cause enough detonation reaction to generate carbon particles. Thus, the yield may be reduced. On the contrary, when the use amount ratio exceeds 1, the explosive substance A more than necessary is used. Thus, the production cost may increase.

The production method (1) of the carbon particles has been described above.

<<Production Method (2)>>

In the aforementioned production method (2), first of all, an explosive substance B which is liquid at normal temperature and normal pressure is disposed in a periphery of a raw material substance B containing an aromatic compound having three or more nitro groups. The aromatic compound having three or more nitro groups is a low explosive raw material contained in the raw material substance B serving as a carbon source for the detonation method. The explosive substance B which is liquid at normal temperature and normal pressure is a substance which can cause stable detonation for producing carbon particles from the raw material substance B. When a molecule constituting the explosive substance B contains a carbon atom, the explosive substance B may serve as a carbon source together with the raw material substance B.

Examples of the aforementioned aromatic compound having three or more nitro groups may include a compound having a structure in which three or more hydrogen atoms of an aromatic ring such as benzene, naphthalene or anthracene are substituted with nitro groups.

The aforementioned aromatic compound may have a substituent other than the nitro groups. Examples of such substituents may include an alkyl group, a hydroxy group, a hydroxyalkyl group, an amino group, a halogen group, and the like.

There may be a case where position isomers are present depending on the positional relation of the nitro groups or the substituents. However, any of the position isomers can be used in the aforementioned production method (2). For example, when the aromatic compound is trinitrotoluene, six kinds of position isomers are conceivable due to the positional relation among three nitro groups and one methyl group. In the present description, the trinitrotoluene means 2,4,6-trinitrotoluene unless otherwise stated.

Examples of such an aromatic compound having three or more nitro groups may include trinitrotoluene (also referred to as TNT), cyclotrimethylenetrinitramine (RDX; also referred to as hexogen), cyclotetramethylenetetranitramine (HMX; also referred to as octogen), pentaerythritol tetranitrate (also referred to as PETN), trinitrophenylmethylnitramine (also referred to as tetryl), and the like. Among these aromatic compounds, TNT is particularly preferred because it is easily available. The aforementioned aromatic compounds having three or more nitro groups may be used either alone or in combination of two or more thereof.

Specific examples of the aforementioned aromatic compounds having three or more nitro groups used in combination of two or more thereof may include high explosive mixtures mainly composed of RDX and TNT, such as Composition B, Cyclotol (75/25), (70/30) or (65/30), and Composition B-2; high explosive mixtures mainly composed of HMX and TNT, such as Octol (75/25); high explosive mixtures mainly composed of TNT and tetryl, such as tetrytol; and the like.

The content proportion of the aromatic compound having three or more nitro groups in the raw material substance B is generally 50% by mass or more, preferably 80% by mass or more, more preferably 90% by mass or more, and still more preferably 95% by mass or more, relative to the total mass of the raw material substance B. Most preferably, the content proportion of the aromatic compound having three or more nitro groups has an upper limit of 100% by mass. However, the upper limit thereof may be preferably about 99% by mass or about 98% by mass.

In the aforementioned production method (2), a liquid high explosive having fluidity at normal temperature and normal pressure is used as the explosive substance B. When the liquid high explosive is used, the degree of freedom in shape is high, an increase in size is easy, and operability or safety can be improved, as compared with the case of using a solid high explosive. The liquid high explosive may be one containing no carbon as its constituent element. Examples of such liquid high explosives may include a mixture of hydrazine and hydrazine nitrate, a mixture of hydrazine and ammonium nitrate, a mixture of hydrazine, hydrazine nitrate and ammonium nitrate, nitromethane, a mixture of hydrazine and nitromethane, and the like. In the present description, the term hydrazine may include the meaning of hydrazine hydrate that is a hydrate thereof.

It is important to use the explosive substance B whose kind and composition are selected properly so that the detonation velocity when the explosive substance B to be disposed in the periphery of the raw material substance B is blasted alone is faster than the detonation velocity when the raw material substance B to be disposed inside the explosive substance B is blasted alone.

The use amounts of the raw material substance B and the explosive substance B may be each properly adjusted depending on the desired amount of the carbon particles, and are not particularly limited. The ratio represented by "explosive substance B/the raw material substance B" is preferably 0.1 or more and more preferably 0.2 or more, and preferably 1 or less, more preferably 0.9 or less and still more preferably 0.8 or less, in mass ratio. When the ratio of the use amount is less than 0.1, the detonation reaction sufficient for forming the carbon particles cannot be performed. Therefore, the yield may possibly be decreased. Conversely, when the ratio of the use amount exceeds 1, the explosive substance B is used more than necessary. Therefore, the production cost may possibly increase.

The method (2) that can produce the aforementioned carbon particles has been described above.

Next, embodiments for carrying out the method for producing the carbon particles will be described in detail with reference to the drawings. FIG. 1 is a sectional diagram schematically showing an example of an explosive device for use in the aforementioned production method (1) or (2). The explosive device shown in FIG. 1 is merely exemplary. It is not intended to limit the present invention.

First of all, an explosive substance 12 is disposed in a periphery of a raw material substance 10. The raw material substance 10 corresponds to the raw material substance A in the case of the aforementioned production method (1), and corresponds to the raw material substance B in the case of the aforementioned production method (2). The explosive substance 12 corresponds to the explosive substance A in the case of the aforementioned production method (1), and corresponds to the explosive substance B in the case of the aforementioned production method (2).

When the explosive substance 12 is disposed in the periphery of the raw material substance 10, it is preferred to symmetrically dispose the raw material substance 10 and the explosive substance 12 in such a manner that high temperature and high pressure associated with a shock wave generated by detonation of the explosive substance 12 are applied to the raw material substance 10 as uniformly as possible, namely, in such a manner that the symmetry of an explosion shape is ensured.

In the above production method (1), for example, in the case (a) where both the raw material substance 10 and the explosive substance 12 are solid, the raw material substance 10 and the explosive substance 12 may be melt-loaded or press-loaded in cylindrical split dies to prepare concentric columnar molded bodies. In the case (b) where the raw material substance 10 is solid and the explosive substance 12 is a liquid high explosive, the raw material substance 10 may be melt-loaded or press-loaded to prepare a columnar molded body, and the molded body may be placed in a center part of an inside of a cylindrical container while allowing axial directions thereof to agree with each other, and thereafter, the liquid high explosive may be injected in the periphery thereof. In the case (c) where the raw material substance 10 is liquid and the explosive substance 12 is solid, the explosive substance 12 may be melt-loaded or press-loaded in a concentric hollow columnar molded body and the liquid raw material substance 10 may be injected in a hollow part thereof.

On the other hand, in the aforementioned production method (2), by taking the fact that the raw material substance 10 is solid and the explosive substance 12 is a liquid high explosive into consideration, for example, the raw material substance 10 may be melt-loaded or press-loaded to prepare a columnar molded body, and the molded body may be placed in a center part of an inside of a cylindrical container while allowing their axial directions to agree with each other. Thereafter, the liquid high explosive may be injected in the periphery thereof. Alternatively, after the liquid high explosive is injected in the cylindrical container, the aforementioned molded body may be placed in the center part of the inside of the aforementioned container while allowing their axial directions to agree with each other.

A container 20 housing the raw material substance 10 and the explosive substance 12 will be hereinafter referred to as an "explosion container". As the explosion container 20, it is preferred to use a container made of a synthetic resin such as an acrylic resin, because contamination with impurities such as metals can be prevented.

In the aforementioned production method (1) or (2), subsequently, the explosive substance 12 is detonated to form carbon particles from the raw material substance 10. The shock wave generated by the detonation reaction of the explosive substance 12 propagates towards the raw material substance 10, the raw material substance 10 is compressed by this shock wave to cause the detonation, and carbon atoms decomposed and liberated from organic molecules constituting the raw material substance 10 are changed to the carbon particles containing the graphite group and nanodiamond.

The detonation may be performed in either an open system or a closed system. In order to perform the detonation in the open system, the detonation may be performed in, for example, an inside of an earthwork or a gallery provided by excavating the underground. The detonation in the closed system is preferably performed in a state where a chamber made of metal is filled with the raw material substance 10 and the explosive substance 12. The state where a chamber made of metal is filled with the raw material substance 10 and the explosive substance 12 is, for example, a state where the molded body of the raw material substance 10 and the explosive substance 12 or the explosion container 20 storing the raw material substance 10 and the explosive substance 12 is suspended in the chamber. It is preferred to perform the detonation in the closed system because a residue can be prevented from being scattered over a wide range. The chamber used for performing the detonation will be hereinafter referred to as an "explosion chamber". When the atmosphere in the explosion chamber is substantially free from oxygen on the occasion of the detonation, an oxidation reaction of the carbon fraction can be inhibited. Therefore, the yield can be improved. In order to obtain such an atmosphere, for example, a gas in the explosion chamber may be substituted with an inert gas such as a nitrogen gas, an argon gas or a carbon dioxide gas; the explosion chamber may be evacuated to about −0.1 to −0.01 MPaG (the symbol "G" attached after the pressure unit means that it is a gauge pressure; the same thing can be applied below); or after releasing the air (oxygen) from the explosion chamber by evacuation, such an inert gas may be injected into the explosion chamber to a weak positive pressure of about +0.000 to +0.001 MPaG. The chamber is not limited to a chamber made of metal as long as the chamber has strength high enough to endure the detonation. For example, the chamber may be made of concrete.

Further, it is preferred to dispose a coolant 32 around the raw material substance 10 and the explosive substance 12 in the explosion chamber. When the coolant 32 is disposed, the formed diamond can be rapidly cooled to prevent phase transition to the graphite group. In order to dispose the coolant 32, for example, the aforementioned molded body or the explosion container 20 may be placed in a cooling container 30, and a coolant 32 may be charged into a gap between the cooling container 30 and the molded body or the explosion container 20. Here, when the coolant 32 is a substance which can substantially prevent generation of an oxidative substance such as oxygen or ozone, the oxidation reaction of the carbon fraction can be inhibited. Therefore, the yield is improved. In order to obtain the coolant 32 like this, for example, an oxygen gas dissolved in the coolant 32 may be removed, or the coolant 32 which does not contain a constituent element producing any oxidative substance such as oxygen or ozone may be used. Examples of such coolants 32 may include water, halogenated alkyls (such as chlorofluorocarbons and carbon tetrachloride), and the like. Water is especially preferred because it has substantially no adverse affection on the environment.

Although the explosive substance 12 is generally blasted by using a detonator or a detonating cord, in order to more surely cause the detonation, a booster 22 may be allowed to intervene between the explosive substance 12 and the detonator or the detonating cord. In this case, after the booster 22 and the detonator or the detonating cord 24 are attached to the molded body or the explosion container 20, they are, for example, loaded in the explosion chamber. Examples of such boosters 22 may include Composition C-4, SEP manufactured by Asahi Kasei Chemicals Corporation, and the like.

When the coolant 32 is used, it is preferred that the aforementioned molded body or the explosion container 20 is housed in a fluid-tight container (for example, a bag using an olefinic synthetic resin such as polyethylene or polypropylene as a raw material) so that, for example, the coolant 32 cannot penetrate into the explosion container 20. After setting up in this way, when the explosive substance 12 is blasted to perform the detonation, the carbon particles containing the graphite group and diamond are obtained as a residue thereof.

In the aforementioned production method, the residue obtained in the detonation step may possibly contain, as impurities, blasted wreckage such as a wreck of the container, a lead wire or a wire. In such a case, it is preferred to provide a step of removing the wreckage from the residue obtained in the detonation step to recover the carbon particles. In this step for recovering the carbon particles, for example, when classification/purification processing is performed, the carbon particles can be obtained in a form of dry powder having a desired particle size. Typically, first of all, after removing rough wreckage from the residue obtained in the detonation step, the resultant is classified with a sieve or the like and separated into a sieve-passing material and a residue on the sieve, and the sieve-passing material is recovered. The residue on the sieve may be crushed and then classified again. Water is separated from the finally obtained sieve-passing material to prepare a dry powder. Here, an opening of the sieve is properly adjusted, and the classification/purification processing is repeated. Then, the sieve-passing material of the sieve having an opening corresponding to a desired particle size may be obtained as a product. In more detail, for example, when the detonation is performed in the explosion chamber using water as the coolant 32, residue-containing water is recovered, followed by sedimentation separation. After removing rough wreckage, a supernatant is recovered as a waste fluid, and a precipitate is classified with a sieve or the like to obtain a sieve-passing material. A part of formed carbon components may possibly attach to the wreckage. Therefore, a residue on the sieve is crushed and separated by means of ultrasonic vibration or the like and classified again with a sieve or the like. For example, a residue on a sieve having an opening of about 100 µm is mostly blasted wreckage such as a wreck of the explosion container 20, a lead wire or a wire. Therefore, such a residue on the sieve is disposed as an industrial waste after recovery. Of the particles passing through a sieve having an opening of about 100 µm, a residue on a sieve having an opening of about 32 µm may be crushed and separated by means of ultrasonic vibration or the like and classified again with a sieve or the like. It is preferred to recover the sieve-passing material of the sieve having the opening of about 32 µm as a final product through these operations. As for the recovered product, water is separated by means of centrifugation or the like, and then dried to obtain a powder of carbon particles having a desired particle size.

For example, when a container made of an acrylic resin is used as the explosion container 20, the residue obtained in the detonation step may possibly be contaminated with particles or powder of the acrylic resin. In this case, the acrylic resin may be removed by, for example, an elution treatment of the acrylic resin with acetone.

Further, in some application, contamination with a metal such as iron is sometimes undesirable. In such a case, for example, the metal such as iron may be removed by treatment with hot concentrated nitric acid.

The obtained powder is nano-scale carbon particles containing the graphite group as well as nanodiamond.

The carbon particles obtained by the aforementioned production method (1) or (2) contain diamond and a graphite group. Therefore, the carbon particles are useful for various applications, making good use of excellent properties of the diamond and the graphite group, either in a state as such or in a state where some post-treatment is performed, as long as the graphite group sufficiently remains. For example, making good use of excellent properties of the diamond, such as polishing properties, durability and wear resistance, the carbon particles are useful for applications such as a tool, an anti-wear agent, a lubricating agent, a fluid grinding stone, a fixed grinding stone, plating or coating, a durable film, and lithium battery parts. Further, making good use of excellent properties of the graphite group, such as electric conductivity, water repellency and biocompatibility, the carbon particles are useful for applications such as a fiber material, a resin coating for imparting functionality, a drug delivery system, an electronic element cover, an electrode material of a battery, a conductive film, a reinforced rubber, a water-repellent rubber, a catalyst, and an adsorbing agent.

EXAMPLES

The present invention will be described below along its examples more specifically. However, the present invention is not intended to be restricted by the following examples, and can be carried out with changes within a scope adaptable to the spirit of the present invention which has been described above and which will be described below. Any of those changes is also encompassed in the technical scope of the present invention.

Based on the above production method (1), the carbon particles were produced in procedures described in the following Experimental Examples 1 to 5.

Experimental Example 1 (2#12)

In this experimental example, carbon particles were produced by a detonation method using dinitrotoluene (DNT) as a raw material substance and using a hydrazine-based liquid high explosive as an explosive substance. More specifically, DNT (industrial grade) was melted and loaded as a raw material substance, and formed into a columnar shape having a diameter of 10 cm and a height of 48 cm. A molded body obtained thus had a mass of 5.52 kg, a volume of 3,770 cm$^3$, and a density of 1.46 g/cm$^3$. In addition, a 75% hydrazine hydrate solution of hydrazine nitrate was subdivided by 2.50 kg and prepared as an explosive substance.

Subsequently, a detonation reaction was performed by using the explosive device as illustrated in FIG. 1. The aforementioned molded body as the raw material substance 10 was placed in the center part of the explosion container 20 having an inside diameter of 12 cm and a height of 50 cm, and the aforementioned liquid high explosive as the explosive substance 12 was filled in the periphery thereof. The booster 22 (SEP), the detonating cord and the No. 6 electric detonator 24 were installed in a top of the explosion container 20, and covered with a lid. After that, the container was housed in a fluid-tight polyethylene bag. A container having a capacity of 100 L was used as the cooling container 30. The explosion container 20 was placed in the cooling container 30. Here, an outer bottom surface of the explosion container 20 was adjusted so as to be positioned at a height of 15 cm from an inner bottom surface of the cooling container 30, using an iron-made stand 34 and an iron-made perforated disk 36. Then, 120 L of distilled water was poured as the coolant 32 in the cooling container 30 and the polyethylene bag so that a gap between the cooling container 30 and the explosion container 20 could be filled with the coolant 32. After being covered with a lid, the cooling container 30 was suspended in an explosion chamber having an internal volume of 30 m$^3$ from a ceiling thereof by using a wire sling. An inside of the aforementioned explosion chamber was evacuated from the atmospheric pressure to adjust the amount of a residual oxygen gas in the explosion chamber to about 279.9 g as calculated value.

After setting up in this way, the aforementioned detonating cord was blasted by the aforementioned detonator, thereby detonating the explosive substance 12. Then, about 120 L of water containing a residue was recovered from the inside of the aforementioned explosion chamber, and rough wreckage was removed by sedimentation separation. Here, since a supernatant was strongly alkaline, citric acid was added thereto to make the pH thereof weakly acidic. The supernatant made weakly acidic was recovered as a waste fluid as it was. A precipitate was classified with sieves having an opening of 100 μm and an opening of 16 μm respectively, using a vibration sieve device ("KG-700-2W" manufactured by Kowa Kogyosho Co., Ltd.). A 16 μm-sieve-passing material was recovered as it was. In Experimental Examples 2 to 5, which will be described later, classification was performed with sieves having an opening of 100 μm and an opening of 32 μm respectively, and a 32 μm-sieve-passing material was recovered as it was.

In Experimental Example 1, of a 100 μm-sieve-passing material, a residue on the sieve having the opening of 16 μm was crushed for about 5 minutes by an ultrasonic vibration device ("4G-250-3-TSA" manufactured by Crest). In each of Experimental Examples 2 to 5, of a 100 μm-sieve-passing material, a residue on the sieve having the opening of 32 μm was crushed in the same manner. A carbon fraction was separated from a wreckage surface and thereafter classified again with sieves having an opening of 100 μm, an opening of 32 μm and an opening of 16 μm respectively, using the vibration sieve device ("KG-700-2W" manufactured by Kowa Kogyosho Co., Ltd.). Sieve-passing materials were recovered. Each of the sieve-passing materials was allowed to stand in a drying machine ("OF-450S" manufactured by AS ONE Corporation) at 80° C. for 24 hours to evaporate moisture, thereby preparing a dry powder thereof.

Thus, 2,048 g in total of carbon particles including 584 g of a 16 μm-sieve-passing material, 907 g of a 32 μm-sieve-passing material and 557 g of a 100 μm-sieve-passing material were obtained. The experiment contents, the recovery amount and yield of the carbon particles in this Experimental Example are shown in the following Table 2.

Experimental Example 2 (2#13)

In this Experimental Example, carbon particles were produced in the same manner as in the aforementioned Experimental Example 1, except that the use amount of the hydrazine-based liquid high explosive as the explosive substance was changed from 2.50 kg to 2.49 kg; the container having a capacity of 100 L as the cooling container was changed to a container having a capacity of 200 L; and the use amount of the distilled water as the coolant was changed from 120 L to 220 L. As a result, 2,334 g in total of carbon particles including 534 g of a 16 μm-sieve-passing material, 1,315 g of a 32 μm-sieve-passing material and 485 g of a 100 μm-sieve-passing material were obtained. The experiment contents, the recovery amount and yield of the carbon particles in this Experimental Example are shown in the following Table 2.

Experimental Example 3 (3#6)

In this Experimental Example, carbon particles were produced in the same manner as in the aforementioned Experimental Example 1, except that the DNT as the raw material substance was changed from 5.52 kg to 5.46 kg in use amount and from 3.770 cm$^3$ to 3,750 cm$^3$ in volume; the container having a capacity of 100 L as the cooling container was changed to a container having a capacity of 200 L; the use amount of the distilled water as the coolant was changed from 120 L to 220 L; the amount (calculated value) of the residual oxygen gas in the chamber was changed from 279.9 g to 191.0 g; and citric acid was not added to the supernatant. As a result, 1.645 g in total of carbon particles including 164 g of a 16 μm-sieve-passing material, 801 g of a 32 μm-sieve-passing material and 680 g of a 100 μm-sieve-passing material were obtained. The experiment contents, the recovery amount and yield of the carbon particles in this Experimental Example are shown in the following Table 2.

Experimental Example 4 (2#15)

In this experimental example, carbon particles were produced by a detonation method using 2,4-dinitrotoluene (2,4-DNT) as a raw material substance and using a hydrazine-based liquid high explosive as an explosive substance. More specifically, 2,4-DNT (industrial grade) was melted and loaded as a raw material substance, and formed into a columnar shape having a diameter of 10 cm and a height of 48 cm. A molded body obtained thus had a mass of 5.48 kg, a volume of 3,785 cm$^3$, and a density of 1.45 g/cm$^3$. In addition, a 75% hydrazine hydrate solution of hydrazine nitrate was subdivided by 2.49 kg and prepared as an explosive substance.

Subsequently, a detonation reaction was performed by using the explosive device as illustrated in FIG. 1 in the same manner as in the aforementioned Experimental Example 1. A container having a capacity of 200 L was used as the cooling container 30. In addition, 220 L of distilled water was used as the coolant 32. As a result, 2,059 g in total of carbon particles including 636 g of a 16 μm-sieve-passing material, 726 g of a 32 μm-sieve-passing material and 697 g of a 100 μm-sieve-passing material were obtained. The experiment contents, the recovery amount and yield of the carbon particles in this Experimental Example are shown in the following Table 2.

Experimental Example 5 (3#1)

In this Experimental Example, carbon particles were produced in the same manner as in the aforementioned Experimental Example 3, except that the DNT as the raw material substance was changed from 3,750 cm³ to 3,800 cm³ in volume and from 1.46 g/cm³ to 1.44 g/cm³ in density; the use amount of the hydrazine-based liquid high explosive as the explosive substance was changed from 2.50 kg to 2.43 kg; and the amount (calculated value) of the residual oxygen gas in the chamber was changed from 191.0 g to 25.52 g. As a result, 1,465 g in total of carbon particles including 177 g of a 16 μm-sieve-passing material, 678 g of a 32 μm-sieve-passing material and 610 g of a 100 μm-sieve-passing material were obtained. The experiment contents, the recovery amount and yield of the carbon particles in this Experimental Example are shown in the following Table 2.

hydrazine nitrate and hydrazine hydrate were mixed at a mass ratio of 3:1 to prepare 0.93 kg of a hydrazine-based liquid high explosive.

Subsequently, a detonation reaction was performed by using the explosive device illustrated in FIG. 1. The aforementioned molded body as the raw material substance 10 was placed in the center part of the explosion container 20 having an inside diameter of 12 cm and a height of 20 cm, and the aforementioned liquid high explosive as the explosive substance 12 was placed in the periphery thereof. The booster 22 (SEP), the detonating cord and the No. 6 electric detonator 24 were installed in a top of the explosion container 20, and covered with a lid. After that, the container was housed in a fluid-tight polyethylene bag. A container having a capacity of 200 L was used as the cooling container 30. The explosion container 20 was placed in the cooling container 30. Here, an outer bottom surface of the explosion container 20 was adjusted so as to be positioned at a height of 29.5 cm from an inner bottom surface of the cooling container 30, using an iron-made stand 34 and an iron-made perforated disk 36. Then, distilled water was poured as the coolant 32 in the cooling container 30 to fill a gap between the cooling container 30 and the explosion container 20 with the coolant 32. Further, a polyethylene bag containing distilled water was placed on an upper part of the cooling

TABLE 2

|  |  | Experimental Example 1 (2#12) | Experimental Example 2 (2#13) | Experimental Example 3 (3#6) | Experimental Example 4 (2#15) | Experimental Example 5 (3#1) |
|---|---|---|---|---|---|---|
| Raw material substance | Kind | DNT | DNT | DNT | 2,4-DNT | DNT |
|  | Mass (kg) | 5.52 | 5.52 | 5.46 | 5.48 | 5.46 |
|  | Volume (cm³) | 3770 | 3770 | 3750 | 3785 | 3800 |
|  | Density (g/cm³) | 1.46 | 1.46 | 1.46 | 1.45 | 1.44 |
| Explosive substance | Kind | NH + HH[1] | NH + HH[1] | NH + HH[1] | NH + HH[1] | NH + HH[1] |
|  | Mass (kg) | 2.50 | 2.49 | 2.50 | 2.49 | 2.43 |
| Cooling container | Volume (L) | 100 | 200 | 200 | 200 | 200 |
| Coolant | Volume (L) | 120 | 220 | 220 | 220 | 220 |
| Explosion chamber | Internal volume (m³) | 30 | 30 | 30 | 30 | 30 |
|  | Residual oxygen gas amount (g) | 279.9 | 279.9 | 191.0 | 279.9 | 25.52 |
| Carbon particles | 16 μm-sieve-passing material (g) | 584 | 534 | 164 | 636 | 177 |
|  | 32 μm-sieve-passing material (g) | 907 | 1315 | 801 | 726 | 678 |
|  | 100 μm-sieve-passing material (g) | 557 | 485 | 680 | 697 | 610 |
|  | Total recovery amount (g) | 2048 | 2334 | 1645 | 2059 | 1465 |
|  | Yield (%)[2] | 37.1 | 42.3 | 30.1 | 37.6 | 26.8 |
| Diamond (D) | Content proportion (% by mass) | 10.5 | 8.2 | 19.0 | 6.3 | 10.7 |
| Graphite carbon (G) | Content proportion (% by mass) | 89.5 | 91.8 | 81.0 | 93.7 | 89.3 |
| Mass ratio | G/D | 8.52 | 11.20 | 4.26 | 14.87 | 8.35 |

[1]Hydrazine-based liquid high explosive obtained by mixing hydrazine nitrate ($H_2N-NH_2 \cdot HNO_3$) and hydrazine hydrate ($H_2N-NH_2 \cdot H_2O$) were mixed at a mass ratio of 3:1
[2]Yield (%) = 100 × (total recovery amount (g) of carbon particles/[mass (kg) of raw material substance × 1000])

Next, carbon particles were manufactured in the procedures described in the following Experimental Examples 6 to 8 based on the aforementioned production method (2).

Experimental Example 6 (3#2)

In this experimental example, carbon particles were produced by a detonation method using TNT as a raw material substance and using a hydrazine-based liquid high explosive as an explosive substance. More specifically, a commercially available columnar molded body (a columnar melt-loaded material of TNT manufactured by Chugoku Kayaku Co., Ltd., a size of 10 cm in diameter and 20 cm in length) was used as the TNT. The mass of the TNT molded body was 2.52 kg, and the density thereof was 1.60 g/cm³. Further, container. 200 L in total of distilled water was used. After the cooling container 30 was covered with a lid, it was suspended in an explosion chamber having an internal volume of 30 m³ from a ceiling thereof by using a wire sling. An inside of the aforementioned explosion chamber was evacuated from the atmospheric pressure to adjust the amount of a residual oxygen gas to about 25.5 g as calculated value.

After setting up in this way, the aforementioned detonating cord was blasted by the aforementioned detonator, thereby detonating the explosive substance 12. Then, about 200 L of water containing a residue was recovered from the inside of the aforementioned explosion chamber, and rough wreckage was removed by sedimentation separation. Here, a supernatant was strongly alkaline, so that the pH thereof was made weakly acidic by adding citric acid. The supernatant made weakly acidic was recovered as a waste fluid as it was. A precipitate was classified with sieves having an opening of 100 μm and an opening of 32 μm, respectively, using a vibration sieve device ("KG-700-2W" manufactured by Kowa Kogyosho Co., Ltd.). A 32 μm-sieve-passing material was recovered as it was.

Of a 100 sieve-passing material, a residue on the sieve having the opening of 32 μm was crushed for about 5 minutes by an ultrasonic vibration device ("4G-250-3-TSA" manufactured by Crest), and a carbon fraction was separated from a wreckage surface and thereafter classified again with sieves having an opening of 100 μm, an opening of 32 μm and an opening of 16 μm, respectively, using the vibration sieve device ("KG-700-2W" manufactured by Kowa Kogyosho Co., Ltd.), and then 100 μm-, 32 μm- and 16 μm-sieve-passing materials were recovered individually. Each of the sieve-passing materials was allowed to stand in a drying machine ("OF-450S" manufactured by AS ONE Corporation) at 80° C. for 24 hours to evaporate moisture, thereby preparing a dry powder.

Thus, 492.5 g in total of carbon particles including 104.5 g of a 16 μm-sieve-passing material, 243.9 g of a 32 μm-sieve-passing material and 144.1 g of a 100 μm-sieve-passing material were obtained. The experiment contents, the recovery amount and yield of the carbon particles, and the total recovery amount and yield of diamond determined by the following XRD quantitative method in this Experimental Example are shown in the following Table 3.

Experimental Example 7 (3#3)

In this experimental example, carbon particles were produced in the same manner as in the aforementioned Experimental Example 6, except that the raw material substance was changed from the TNT molded body having a mass of 2.52 kg and a density of 1.60 g/cm$^3$ to a TNT molded body (a columnar melt-loaded material of TNT manufactured by Chugoku Kayaku Co., Ltd., a size of 10 cm in diameter and 30 cm in length) having a mass of 3.82 kg and a density of 1.61 g/cm$^3$; and the use amount of the hydrazine-based liquid high explosive as the explosive substance was changed from 0.93 kg to 1.29 kg. As a result, 770.8 g in total of carbon particles including 192.1 g of a 16 μm-sieve-passing material, 356.5 g of a 32 μm-sieve-passing material and 222.2 g of a 100 μm-sieve-passing material were obtained. The experiment contents, the recovery amount and yield of the carbon particles, and the total recovery amount and yield of diamond determined by the following XRD quantitative method in this Experimental Example are shown in the following Table 3.

Experimental Example 8 (3#4)

In this experimental example, carbon particles were produced in the same manner as in the aforementioned Experimental Example 6, except that the raw material substance was changed from the TNT molded body having a mass of 2.52 kg and a density of 1.60 g/cm$^3$ to a TNT molded body (a columnar melt-loaded material of TNT manufactured by Chugoku Kayaku Co., Ltd., a size of 10 cm in diameter and 50 cm in length) having a mass of 6.30 kg and a density of 1.59 g/cm$^3$; the use amount of the hydrazine-based liquid high explosive as the explosive substance was changed from 0.93 kg to 2.17 kg; the use amount of distilled water as the coolant was changed from 200 L to 220 L. As a result, 1,125.6 g in total of carbon particles including 257.4 g of a 16 μm-sieve-passing material, 531.8 g of a 32 μm-sieve-passing material and 336.4 g of a 100 μm-sieve-passing material were obtained. The experiment contents, the recovery amount and yield of the carbon particles, and the total recovery amount and yield of diamond determined by the following XRD quantitative method in this Experimental Example are shown in the following Table 3.

TABLE 3

| | | Experimental Example 6 (3#2) | Experimental Example 7 (3#3) | Experimental Example 8 (3#4) |
|---|---|---|---|---|
| Raw material substance | Kind | TNT | TNT | TNT |
| | Mass (kg) | 2.52 | 3.82 | 6.3 |
| | Volume (cm$^3$) | 1580 | 2380 | 3960 |
| | Density (g/cm$^3$) | 1.60 | 1.61 | 1.59 |
| Explosive substance | Kind | NH + HH[1] | NH + HH[1] | NH + HH[1] |
| | Mass (kg) | 0.93 | 1.29 | 2.17 |
| Cooling container | Volume (L) | 200 | 200 | 200 |
| Coolant | Volume (L) | 200 | 200 | 220 |
| Explosion chamber | Internal volume (m$^3$) | 30 | 30 | 30 |
| | Residual oxygen gas amount (g) | 25.5 | 25.5 | 25.5 |
| Carbon particles | 16 μm-sieve-passing material (g) | 104.5 | 192.1 | 257.4 |
| | 32 μm-sieve-passing material (g) | 243.9 | 356.5 | 531.8 |
| | 100 μM-sieve-passing material (g) | 144.1 | 222.2 | 336.4 |
| | Total recovery amount (g) | 492.5 | 770.8 | 1125.6 |
| | Yield (% by mass)[2] | 19.5 | 20.2 | 17.9 |
| Diamond | Total recovery amount (g) | 231.1 | 432 | 616.5 |
| | Yield (% by mass)[3] | 9.2 | 11.3 | 9.8 |
| Diamond (D) | Content proportion (% by mass) | 46.9 | 56 | 54.8 |
| Graphite carbon (G) | Content proportion (% by mass) | 53.1 | 44 | 45.2 |
| Mass ratio | G/D | 1.13 | 0.78 | 0.82 |

[1]Hydrazine-based liquid high explosive obtained by mixing hydrazine nitrate ($H_2N$—$NH_2 \cdot HNO_3$) and hydrazine hydrate ($H_2N$—$NH_2 \cdot H_2O$) are mixed at a mass ratio of 3:1
[2]Yield (%) = 100 × (total recovery amount (g) of carbon particles/[mass (kg) of raw material substance × 1000])
[3]Yield (%) = 100 × (total recovery amount (g) of diamond/[mass (kg) of raw material substance × 1000])

Next, the carbon particles obtained in Experimental Examples 1 to 8 were observed by a transmission electron microscope (TEM) in the following procedure.

<TEM Observation>

The obtained carbon particles were observed using a TEM having a CCD camera and a photographing magnification and capable of observing lattice images of diamond and graphite group having a lamination structure. Specific measurement conditions of the TEM are shown below.

Device name of TEM: transmission electron microscope. JEM-ARM200F, manufactured by JEOL Ltd.

Measurement method: suspension method, dispersion solvent: methanol

Accelerating voltage: 200 kV

CCD camera UltraScan, manufactured by Gatan

Photographing magnification: 300,000 times and 800,000 times

Imaging magnification: 2,200,000 times, and 5,900,000 times when printed in A4 size From the results of measurement using the TEM, it was observed that the carbon particles obtained by the production method of the present invention were formed of nanoscale diamond and graphite group. Detailed description will be made below.

First, description will be made about results in which the carbon particles obtained in Experimental Example 1 (2#12) and Experimental Example 8 (3#4) were observed at a low magnification.

Figure 2:
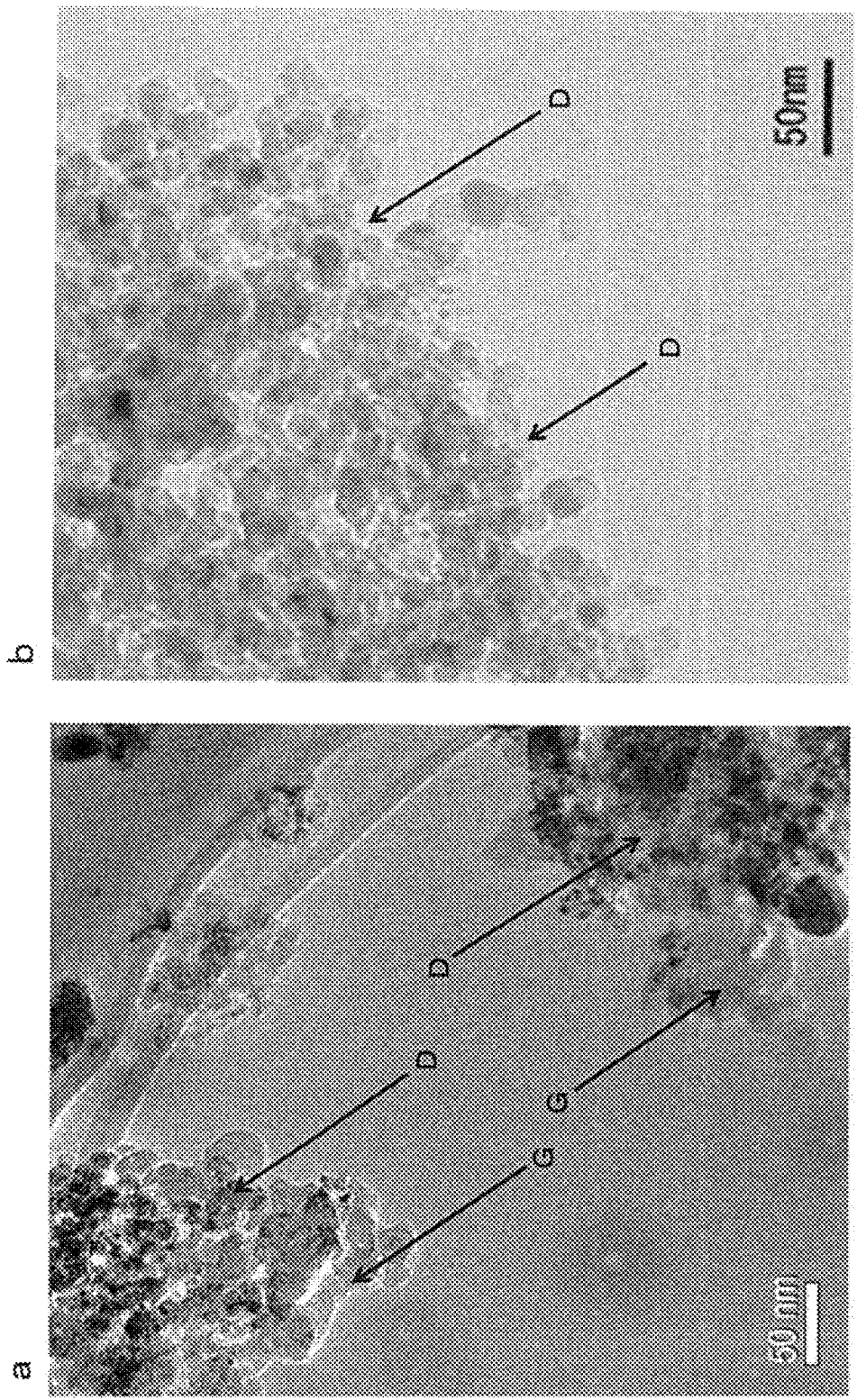
FIG. 2 A drawing substitute photograph a of FIG. 2 shows carbon particles obtained in Experimental Example 1 (2#12) and a drawing substitute photograph b of FIG. 2 shows carbon particles obtained in Experimental Example 8 (3#4).

The carbon particles obtained in Experimental Example 1 (2#12) were taken in the drawing substitute photograph a of FIG. 2, and the carbon particles obtained in Experimental Example 8 (3#4) were taken in the drawing substitute photograph b of FIG. 2. In each photograph, an imaging magnification corresponds to 320,000 times when FIG. 2 is printed in A4 horizontal format. In FIG. 2, a part represented by the sign G designates a graphite group, and a part represented by the sign D designates diamond.

The carbon particles in Experimental Example 1 (2#12) were produced by the aforementioned production method (1) as described above, and the carbon particles in Experimental Example 8 (3#4) were produced by the aforementioned production method (2) as described above. As is understood from comparison between the photographs a and b of FIG. 2, when images are taken in the low magnification, it is observed that a graphite group and diamond are mixed obviously in the carbon particles obtained in Experimental Example 1 (2#12), while diamond is a major part of the carbon particles obtained in Experimental Example 8 (3#4) and few graphite group is observed.

Next, description will be made about results in which the carbon particles obtained in Experimental Example 3 (3#6) and Experimental Example 8 (3#4) were observed at a high magnification.

Figure 3:
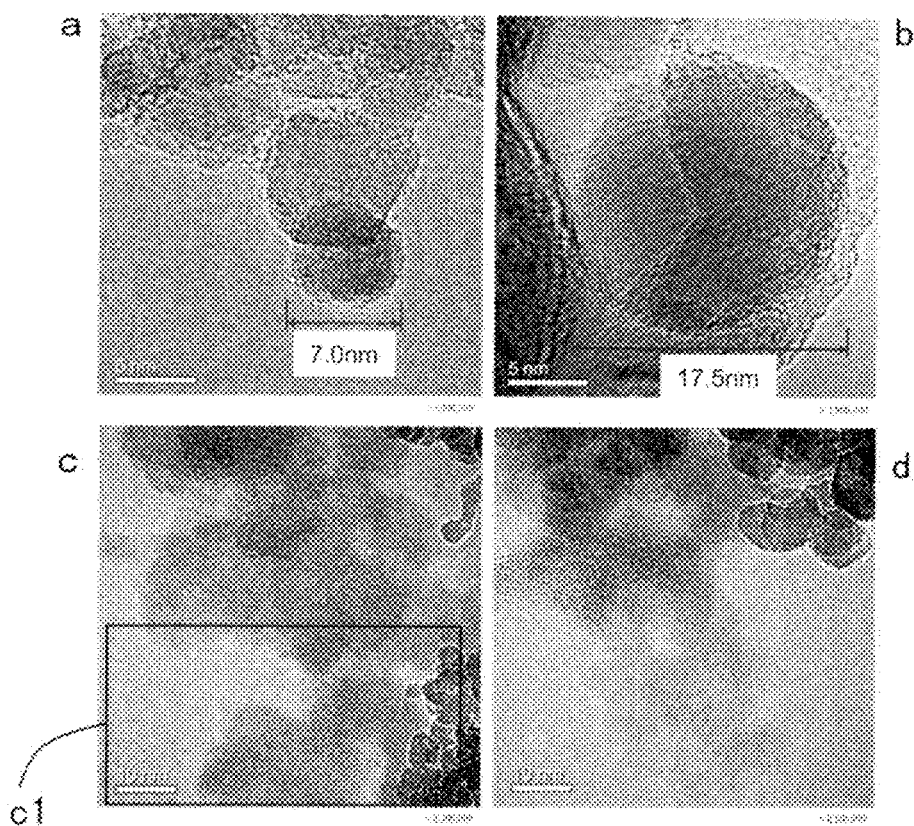
FIG. 3 shows transmission electron microscopic (TEM) photographs of carbon particles obtained in Experimental Example 3 (3#6).

Among the carbon particles obtained in Experimental Example 3 (3#6), transmission electron microscopic (TEM) photographs of the 16 μm-sieve-passing material are shown in FIG. 3. FIG. 4 shows a drawing substitute photograph in which a part enclosed by c1 in a drawing substitute photograph c of FIG. 3 is enlarged.

Among the drawing substitute photographs shown in FIG. 3, in the photograph a shown in the upper left, a carbon particle having a round shape and found among the carbon particles was enlarged with an imaging magnification corresponding to 5,900,000 times. From the photograph a, it can be confirmed that the particle diameter of the carbon particle having the round shape is about 7.0 nm. Also in the photograph b shown in the upper right of FIG. 3, a carbon particle having a round shape and found among the carbon particles was enlarged with an imaging magnification corresponding to 5,900,000 times. From the photograph b, it can be confirmed that the particle diameter of the carbon particle having the round shape is about 17.5 nm. The result of the measured lattice spacing in the carbon particles having the round shapes shown in the photographs a and b in FIG. 3 was 2.11 Å. It is generally said that the D 111 plane lattice spacing in diamond is 2.06 Å, and the difference ratio therefrom is 2.4%. Therefore, the carbon particles having the round shapes can be regarded as diamond.

On the other hand, the imaging magnification of the photograph c shown in the lower left of FIG. 3 corresponds to 2,200,000 times. In the photograph c, carbon particles having round shapes and carbon particles having irregular lattice structures were observed. The particle diameters of the carbon particles having the round shapes and observed in the photograph c were about 2.0 to 4.0 nm. The imaging magnification of the photograph d shown in the lower right of FIG. 3 corresponds to 2,200,000 times. In the photograph d, carbon particles having round shapes and carbon particles having an irregular lattice structure were observed in the same manner as in the aforementioned photograph c. The particle diameters of the carbon particles having the round shapes and observed in the photograph d were about 6.0 to 10.0 nm.

FIG. 4 shows the photograph in which a part of the photograph c shown in FIG. 3 is enlarged. As shown by the symbol G, a field where carbon particles having an irregular lattice structure can be observed is enlarged so that a lattice image thereof can be observed. The result of the observed plane interval of lamination was 3.46 Å. It is said that the G002 plane interval of lamination of hexagonal graphite (powder diffractometry) is 3.37 Å, and the difference ratio therefrom is 2.4% in the same manner. Thus, the observed plane interval of the lamination substantially agreed with the plane interval of lamination of graphite. It is therefore considered that the laminated nano-scale carbon particles shown by the symbol G are of graphite carbon (nanographite), occupying a main proportion of the carbon particles. Further, in the photograph shown in FIG. 4, the dimension in a direction perpendicular to a lamination direction was 1.5 to 10 nm. As is apparent from FIG. 4, it is found that the lamination direction of each graphite piece is irregular, and the lamination directions of adjacent ones of the graphite pieces are not identical to each other.

Figure 5:
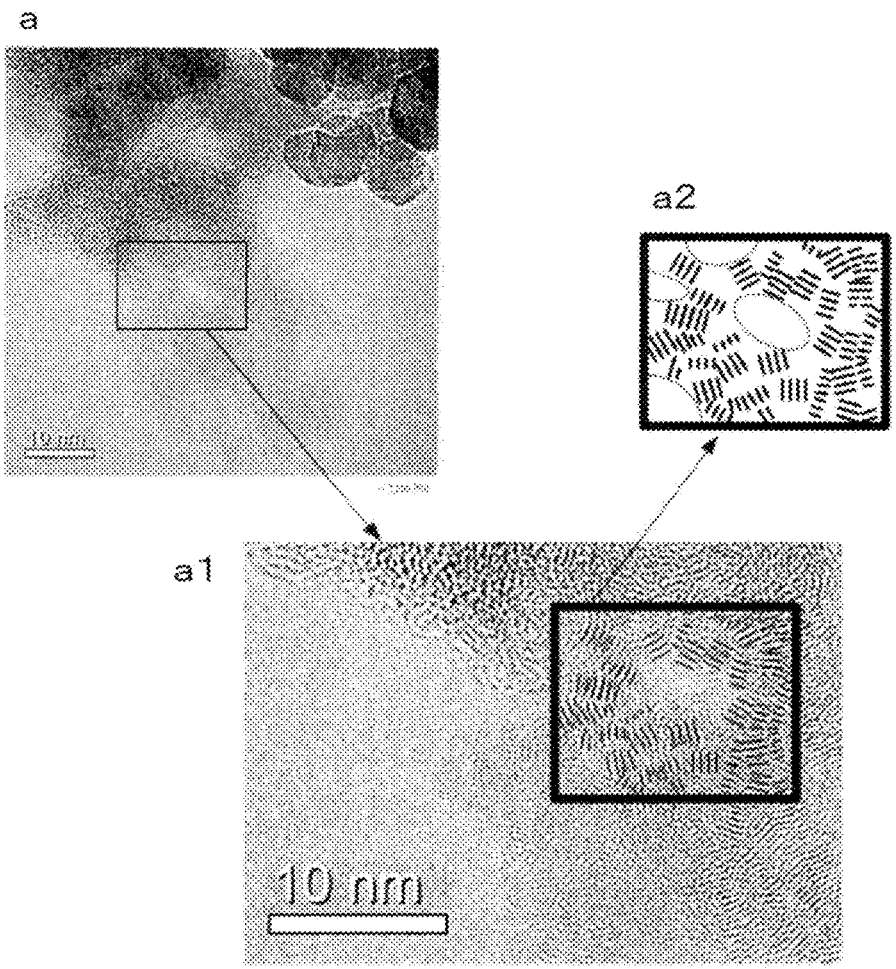
FIG. 5 shows a schematic diagram for describing a form of a graphite group, using the drawing substitute photograph d shown in FIG. 3.

FIG. 5 shows a schematic diagram for explaining a form of a graphite group, using the drawing substitute photograph d shown in FIG. 3. The drawing substitute photograph a shown in FIG. 5 is identical to the drawing substitute photograph d shown in FIG. 3.

The drawing substitute photograph a1 shown in FIG. 5 is a drawing substitute photograph in which a part enclosed by a rectangle in the drawing substitute photograph a is enlarged. The schematic diagram a2 shown in FIG. 5 is created by tracing a part enclosed by a rectangle in the drawing substitute photograph a1. The solid lines shown in the diagram a2 designate a lamination state of graphite, and the broken lines designate gaps.

As is apparent from the drawing substitute photograph a1 and the schematic diagram a2 shown in FIG. 5, fine graphite pieces short in dimension in a direction perpendicular to a lamination direction thereof are densely distributed, and the lamination directions of the graphite pieces are irregular.

Figure 6:
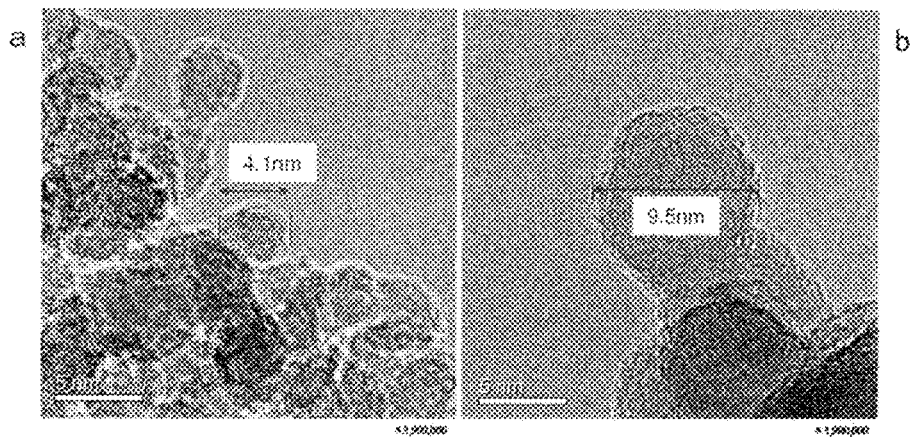
FIG. 6 shows transmission electron microscopic (TEM) photographs of carbon particles obtained in Experimental Example 8 (3#4).

Next, of the carbon particles obtained in Experimental Example 8 (3#4), transmission electron microscopic (TEM) photographs of a 16 μm-sieve-passing material are shown in FIG. 6.

Among the photographs shown in FIG. 6, in the photograph a shown in the left, a part of a large number of carbon particles each having a round shape is enlarged and taken with an imaging magnification corresponding to 5,900,000 times. From the photograph a, it can be confirmed that the particle diameter of a carbon particle having a round shape is about 4.1 nm. In the photograph b shown in the right, a carbon particle having a round shape and found among the carbon particles is enlarged with an imaging magnification corresponding to 5,900,000 times in the same way as the above photograph a. From the photograph b, it can be confirmed that the particle diameter of the carbon particle having the round shape is about 9.5 nm. As described above, the round carbon particles observed in the photographs a and b can be regarded as diamond.

Next, X-ray diffraction (XRD) of the obtained carbon particles was measured and evaluated.

<XRD Quantitative Method>

Figure 7:
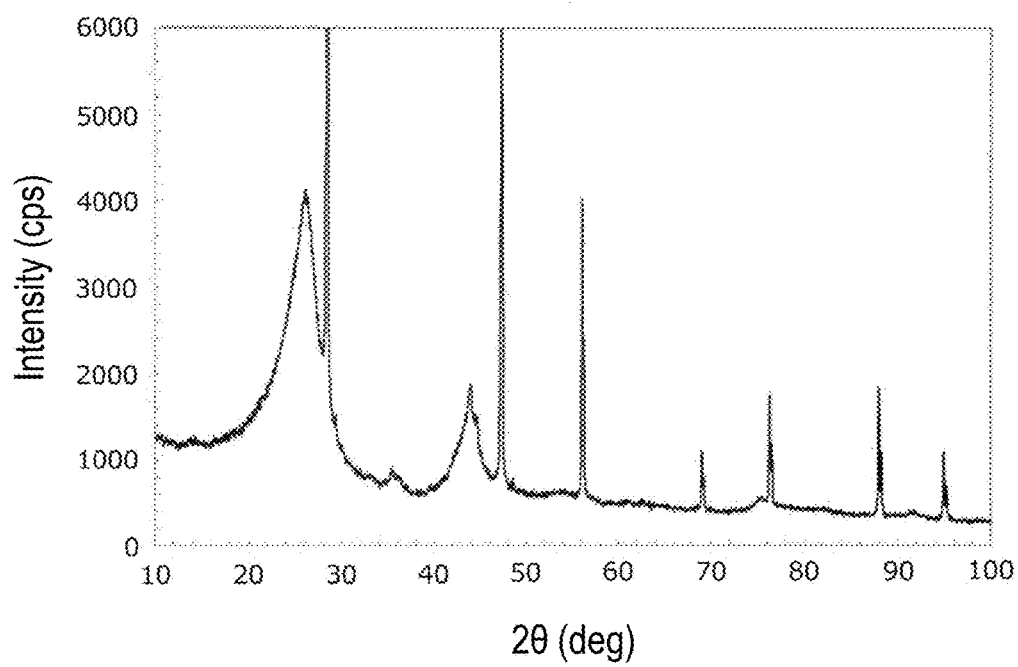
FIG. 7 is an X-ray diffraction chart of the carbon particles obtained in Experimental Example 3 (3#6).

First, among the carbon particles obtained in Experimental Example 3 (3#6), the X-ray diffraction chart of the 100 μm-sieve-passing material is shown in FIG. 7.

Figure 8:
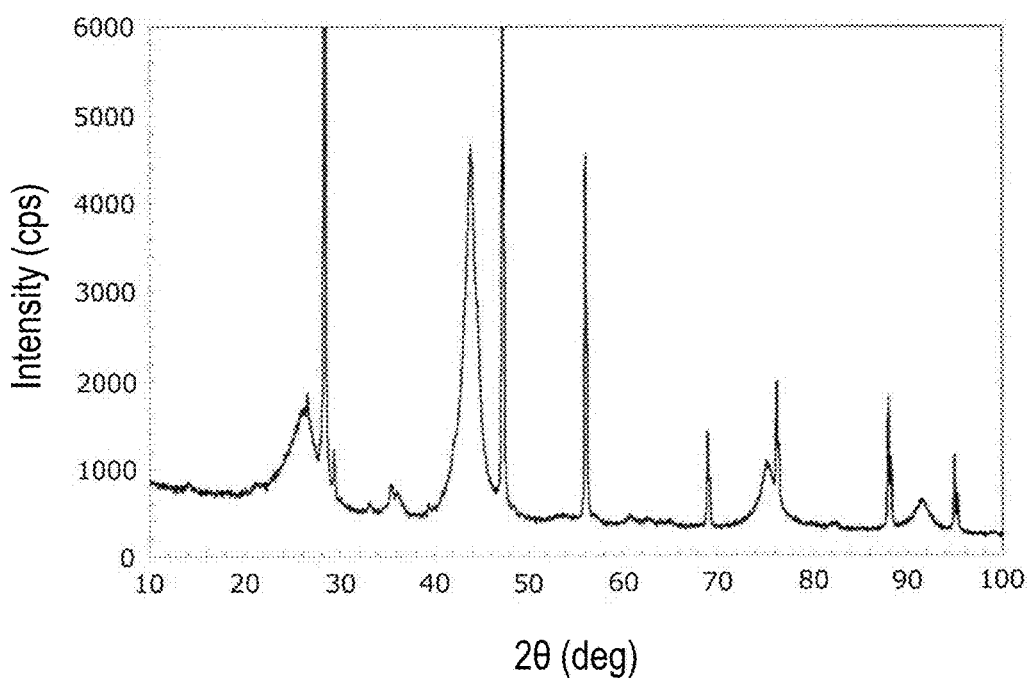
FIG. 8 is an X-ray diffraction chart of the carbon particles obtained in Experimental Example 8 (3#4).

In addition, among the carbon particles obtained in Experimental Example 8 (3#4), the X-ray diffraction chart of the 100 μm-sieve-passing material is shown in FIG. 8.

Measuring conditions of the X-ray diffraction are shown below.

Device name of X-ray diffraction device: Horizontal X-ray diffraction device, SmartLab, manufactured by Rigaku Corporation Measurement method: θ-2θ
X-ray source: Cu-Kα ray
Excitation voltage-current: 45 kV-200 mA
Divergence slit: ⅔°
Scattering slit: ⅔°
Receiving slit: 0.6 mm Next, among the carbon particles obtained in Experimental Examples 1 to 8. XRD of the carbon particles in the 16 μm-sieve-passing material was measured. From the measurement result, integrated intensity was obtained about a diffraction peak appearing near 2θ=75° in the D220 surface of diamond, and the proportion of diamond contained in the carbon particles was obtained using each calibration curve prepared in advance.

As a standard substance for determining the quantity of diamond, diamond which had been purified by removing the graphite group and the like with perchloric acid from diamond-containing carbon particles separately produced in the present invention was used. A silicon powder (Stansil-G03A manufactured by Osaka Yakken Co. Ltd., D50=5.2 μm) of 10% by mass to the total carbon amount was added as an internal standard.

The calibration curve was prepared using 5 standard samples by performing 4-point measurement from the ratio of the integrated intensity of the aforementioned diffraction peak and the integrated intensity of the diffraction peak on each of the Si 220 plane and the Si 311 plane of a silicon crystal added to each of the samples. The two peaks of the silicon crystal is used to suppress the influence of orientation of the powdered silicon. The 5 standard samples were prepared by mixing silicon crystals with the diamond so as to provide 0% by mass, 25% by mass, 50% by mass, 75% by mass and 100% by mass, as content proportions of diamond, respectively.

The calibration curve for diamond was obtained by plotting with the concentration of diamond on the ordinate and with the peak area intensity ratio D220/(Si220+Si311) of diamond and silicon on the abscissa. A relational expression between the concentration Y of diamond and the intensity ratio X was Y=117.12×X, in accordance with linear approximation by a least squares method. The obtained calibration curve is shown in FIG. 9.

Figure 9:
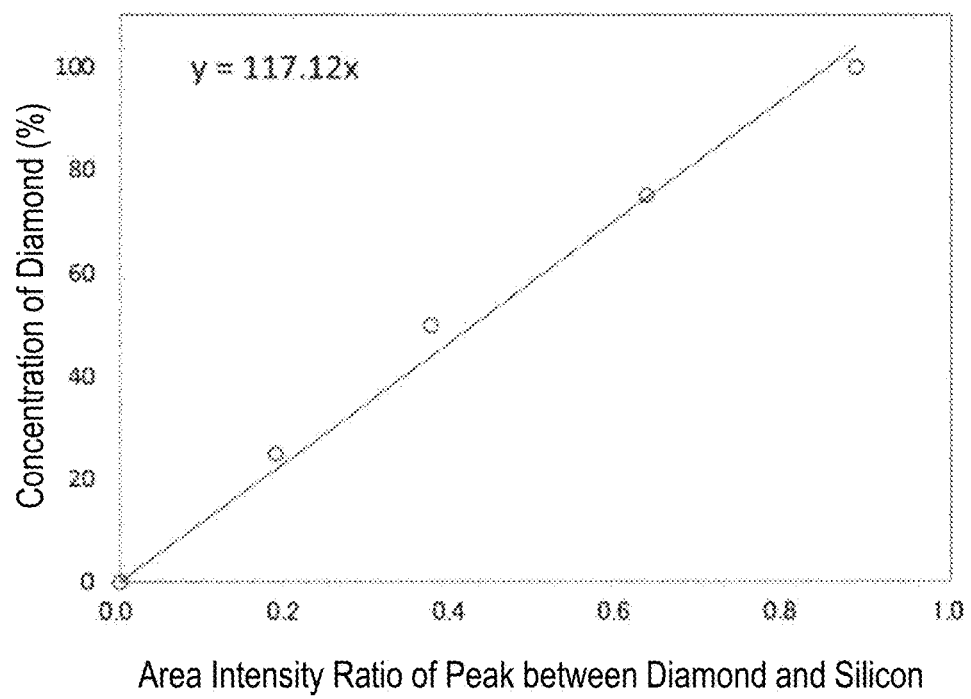
FIG. 9 is a graph showing a calibration curve used for obtaining a content proportion of diamond in the carbon particles.

From the measurement results of X-ray diffraction (XRD), the aforementioned ratio of area intensity with respect to the diffraction peak was calculated for each of Experimental Examples 6 to 8, and the content proportion of diamond occupying the carbon particles was determined using a calibration curve shown in FIG. 9. The total recovery amount of the carbon particles was multiplied by the content proportion of obtained diamond to calculate the total recovery amount of diamond. It was found that the carbon particles obtained by the aforementioned production method (2) included diamond and a graphite group as its main components. Substantially no carbon components having a structure other than the diamond and the graphite group were recognized.

The content proportion of the diamond obtained in Experimental Examples 1 to 8 was divided by the estimated graphite group content proportion to calculate the mass ratio G/D. It was found that diamond and the graphite group were main components. Carbons having other structures could not be observed.

The content proportion of diamond (D: when the carbon particles were regarded as 100% by mass) was obtained in the carbon particles obtained in each of Experimental Examples 1 to 8. Of the carbon particles, carbon particles other than diamond were assumed as the graphite group, and the content proportion (G) of the graphite group was calculated. The mass ratio G/D was calculated based on the content proportion (D) of diamond contained in the carbon particles and the content proportion (G) of the graphite group contained in the carbon particles. The results of the Experimental Examples 1 to 5 is shown in the aforementioned Table 2, and the results of the Experimental Examples 6 to 8 are shown in the aforementioned Table 3.

From Table 2, it is found that the graphite group can be produced by the detonation method even when DNT or 2,4-DNT which is an inexpensive non-explosive raw material is used as the raw material substance and even when liquid high explosive is used as the explosive substance.

In addition, it is found from Table 3 that the graphite group can be produced by the detonation method using TNT, which is a low explosive raw material, as the raw material substance, and using a liquid high explosive as the explosive substance.

It is found from Table 3 that carbon particles containing a graphite group can be produced by a detonation method, using TNT, which is a low explosive raw material, and a hydrazine-based liquid high explosive together. In addition, the obtained carbon particles had a high content proportion of diamond, and in fact, the yield of the diamond showed a high value of 9.2% to 11.3%. In contrast, Table 2 of the aforementioned Non-Patent Literature 1 describes that the yield of diamond in the conventional method is 2.8% when TNT is used alone, 4.1% to 8.3% when TNT and RDX are used together, and 3.75% to 8.2% when TNT and HMX are used together. Accordingly, according to the aforementioned production method (2) using a low explosive raw material and a liquid high explosive, it is possible to produce carbon particles higher in content proportion of diamond than that in the conventional method using a low explosive raw material alone or using a low explosive raw material and a solid high explosive together.

For the carbon particles obtained in each of the aforementioned Experimental Examples 1 to 8, the value of G/(G+D) was calculated based on the content proportion (D) of diamond contained in the carbon particles and the content proportion (G) of graphite group contained in the carbon particles. The calculation result is shown in the following Table 4 together with the aforementioned mass ratio G/D. In addition, the following Table 4 shows the values of G/D and G/(G+D) in a commercial product available as nanodiamond on the market.

TABLE 4

| Nanocarbon particle | Test item Mass ratio | |
|---|---|---|
| | G/D | G/(G + D) |
| Experimental Example 1 (2#12) | 8.52 | 0.90 |
| Experimental Example 2 (2#13) | 11.20 | 0.92 |
| Experimental Example 3 (3#6) | 4.26 | 0.81 |
| Experimental Example 4 (2#15) | 14.87 | 0.94 |
| Experimental Example 5 (3#1) | 8.35 | 0.89 |
| Experimental Example 6 (3#2) | 1.13 | 0.53 |

TABLE 4-continued

|  | Nanocarbon particle | Test item Mass ratio | |
|---|---|---|---|
|  |  | G/D | G/(G + D) |
| Experimental Example 7 (3#3) | | 0.78 | 0.44 |
| Experimental Example 8 (3#4) | | 0.82 | 0.45 |
| Commercial product[1] (reference) | NUAC | 2.03 | 0.67 |
| | ND62 | <0.01 | <0.01 |
| | NanoAmand ® | <0.01 | <0.01 |
| | BD | 0.16 | 0.14 |
| | UDD | 0.03 | 0.03 |

[1]NUAC and ND62 made in China, NanoAmand made in Japan, BD and UDD made in Russia/Ukraine From the aforementioned Table 4, it is found that the content proportion of the graphite group in the carbon particles obtained in the aforementioned Experimental Examples 1 to 5 is higher than those in the commercial products.

Next, with regard to the carbon particles obtained in Experimental Examples 1 to 5, a crystallite size was obtained from the X-ray diffraction data using the Scherrer equation: $D=K\lambda/\beta \cos \theta$. Here, D designates the crystallite size (Å), λ designates a wavelength of an X-ray tube bulb (1.5418 Å of Cu-Kα ray in the examples), β designates a spread of diffracted X-rays caused by the crystallite, θ designates an angle of diffraction (rad), and K designates a Scherrer constant, which was set at 0.9 (B. D. Cullity (Author), Gentaro Matsumura (translator), "X-ray diffraction main theory (new edition)", Agne Shofusha. March, 1999). The spread β was obtained from $\beta=(\beta \exp^2-\beta i^2)^{1/2}$ using a width β exp of the measured diffracted X-rays and a spread βi of the diffracted X-rays caused by the device.

The measured diffracted X-rays were subjected to smoothing, background removal and Kα2 removal. After that, half-value widths of a peak near 260 (generally referred to as G002) and a peak near 43° (generally referred to as D111) were obtained, and each of the obtained half-value widths was set as the width β exp of the measured diffracted X-rays. The G002 peak is a peak caused by the graphite group, and the D111 peak is a peak caused by diamond. In addition, 10% by mass of Si powder (Stansil-G03A manufactured by Osaka Yakken Co. Ltd., 5.2 µm in center particle size) was added, and a half value width of a peak near 47° (generally referred to as Si220) in diffraction X-rays was set as βi.

SmartLab which is a horizontal X-ray diffraction device manufactured by Rigaku Corporation was used as an X-ray diffraction device. It is the same device as in the aforementioned <XRD Quantitative Method>.

Crystallite sizes estimated from the measured X-ray diffraction data of the carbon particles obtained in the aforementioned Experimental Examples 1 to 5 are shown in the following Table 5. As a result, it is considered that the crystallite size of diamond calculated based on the half value width of the D111 peak is 2 to 5 nm. That is, the crystallite size of diamond obtained from the diffracted X-ray width of diamond by the Scherrer equation substantially agrees with the result of TEM observation which will be described later.

On the other hand, the crystallite size of the graphite group calculated based on the half value width of the G002 peak was 2 to 4 nm. In this manner, the crystallite size is estimated on the assumption that the plane interval is fixed and only the crystallite size is different. However, it has been found that the graphite group has a so-called turbostratic structure in which hexagonal net surfaces of graphite pieces are layered in parallel but regularity cannot be observed in its orientation. It is therefore assumed that the crystallite size obtained from a mixture of peaks near 26° in which various deformed substances take part is not correct. Thus, the crystallite size of the graphite group estimated in this manner is regarded as reference data.

TABLE 5

| | | Diffracted X-ray width Bexp | | Diffracted X-ray spread Device βi | | |
|---|---|---|---|---|---|---|
| | Part | 2θ (°) | Half value width (rad) | Si220 half value width (rad) | Spread β caused by crystallite (rad) | Estimated crystallite size (Å) |
| Experimental Example 1 (2#12) | G 002 | 25.7 | 0.078 | 0.003 | 0.0784 | 21 |
| | D 111 | 43.6 | 0.063 | | 0.0632 | 24 |
| Experimental Example 2 (2#13) | G 002 | 25.8 | 0.070 | 0.003 | 0.0702 | 25 |
| | D 111 | 43.6 | 0.056 | | 0.0564 | 26 |
| Experimental Example 3 (3#6) | G 002 | 26.0 | 0.054 | 0.003 | 0.0538 | 39 |
| | D 111 | 43.8 | 0.026 | | 0.0262 | 54 |
| Experimental Example 4 (2#15) | G 002 | 25.9 | 0.079 | 0.003 | 0.0789 | 24 |
| | D 111 | 43.6 | 0.056 | | 0.0556 | 27 |
| Experimental Example 5 (3#1) | G 002 | 26.0 | 0.052 | 0.003 | 0.0520 | 42 |
| | D 111 | 43.0 | 0.052 | | 0.0520 | 28 |

Next, the particle size of primary particles of diamond, the lattice spacing in the DI 11 plane of diamond, and the plane interval in the lamination of the graphite group were measured based on photographs taken by TEM observation. The results are shown in the following Table 6. The crystallite size of diamond calculated based on the half value width of the D111 peak shown in the aforementioned Table 5 is also shown in the following Table 6. As is apparent from the following Table 6, the particle size of the primary particles observed in the transmission electron microscopic (TEM) photographs of the carbon particles were about several to 20 nm. However, it is assumed that a particle with the smallest particle size of the particles shown in the photographs was expressed in the crystallite size estimated from the X-ray diffraction data.

TABLE 6

| | Experimental result | | | |
|---|---|---|---|---|
| | XRD crystallite size (Å)[1] | TEM observed size (Å)[2] | | |
| | | Diamond particle size | Diamond D111 | Graphite carbon |
| Experimental Example 1 (2#12) | 24 | — | — | — |
| Experimental Example 2 (2#13) | 26 | — | — | — |
| Experimental Example 3 (3#6) | 54 | Several to several tens | 2.1 | 3.5 |
| Experimental Example 4 (2#15) | 27 | Several to several tens | — | 3.8 |
| Experimental Example 5 (3#1) | 28 | — | — | — |

[1]XRD crystallite size: diamond crystallite size (Å) obtained from line width of X-ray diffraction line
[2]TEM observed size (Å): primary particle size of diamond, lattice spacing of the diamond D111 plane, and plane interval (Å) in the lamination of graphite carbon, obtained approximately from transmission electron microscopic photographs While the present invention has been described in detail and with reference to specific embodiments thereof, it will be apparent to one skilled in the art that various changes and modifications can be made therein without departing from the spirit and scope thereof.

This application is based on Japanese Patent Application No. 2015-133154 filed on Jul. 1, 2015, the entire subject matters of which are incorporated herein by reference.

INDUSTRIAL APPLICABILITY

According to the present invention, the graphite group including nanographite, and the carbon material including the graphite group and nanodiamond are obtained, and thus, a new functional material is obtained.

DESCRIPTION OF REFERENCE NUMERALS

10 Raw material substance
12 Explosive substance
20 Explosion container
22 Booster
24 Detonator or detonating cord
30 Cooling container
32 Coolant
34 Stand
36 Perforated disk

The invention claimed is:

1. A graphite group comprising graphite pieces, wherein: when observed by a transmission electron microscope, the graphite pieces have a lamination with a plane interval of 0.2 to 1 nm, and have a dimension of 1.5 to 10 nm in a direction perpendicular to a lamination direction; and
the lamination direction in each of the graphite pieces is irregular.

2. A carbon particle which is a mixture of the graphite group according to claim 1 and diamond, wherein:
the carbon particle is obtained by a detonation method; and
a ratio G/D of a mass G of the graphite group to a mass D of the diamond in the carbon particle is 0.7 to 20.

3. The carbon particle according to claim 2, wherein the detonation method comprises:
(1) a step of disposing an explosive substance A with a detonation velocity of 6,300 m/sec or higher in a periphery of a raw material substance A containing an aromatic compound having two or less nitro groups and a step of detonating the explosive substance A; or
(2) a step of disposing an explosive substance B which is liquid at normal temperature and normal pressure in a periphery of a raw material substance B containing an aromatic compound having three or more nitro groups and a step of detonating the explosive substance B.

4. The carbon particle according to claim 3, wherein the raw material substance A contains at least one kind selected from the group consisting of dinitrotoluene, dinitrobenzene and dinitroxylene.

5. The carbon particle according to claim 3, wherein the raw material substance B contains at least one kind selected from the group consisting of trinitrotoluene, cyclotrimethylenetrinitramine, cyclotetramethylenetetranitramine, pentaerythritol tetranitrate and trinitrophenylmethylnitramine.

* * * * *